United States Patent
Ruggiero et al.

(10) Patent No.: US 10,846,970 B2
(45) Date of Patent: Nov. 24, 2020

(54) VENDING SYSTEM WITH SMART LOCK MECHANISMS

(71) Applicant: Innovative Strollers, LLC, Clayton, NJ (US)

(72) Inventors: Richard Ruggiero, Sewell, NJ (US); Gregory Ruggiero, Sewell, NJ (US); Matthew Marino, Mullica Hill, NJ (US)

(73) Assignee: INNOVATIVE VENDING SOLUTIONS LLC, Clayton, NJ (US)

( * ) Notice: Subject to any disclaimer, the term of this patent is extended or adjusted under 35 U.S.C. 154(b) by 0 days.

(21) Appl. No.: 16/735,259

(22) Filed: Jan. 6, 2020

(65) Prior Publication Data

US 2020/0234526 A1    Jul. 23, 2020

Related U.S. Application Data

(60) Provisional application No. 62/794,185, filed on Jan. 18, 2019.

(51) Int. Cl.
*G07F 7/06*     (2006.01)
*B62B 5/00*     (2006.01)
(Continued)

(52) U.S. Cl.
CPC .......... *G07F 7/0627* (2013.01); *B62B 5/0096* (2013.01); *G06Q 20/18* (2013.01); *A47F 10/04* (2013.01)

(58) Field of Classification Search
CPC .... G07F 7/0618; G07F 7/0627; G07F 7/0636; G07F 7/0645; G07F 7/0663;
(Continued)

(56) References Cited

U.S. PATENT DOCUMENTS 3,102,648 A   9/1963  Hughes et al.
3,948,379 A   4/1976  Warner
(Continued)

FOREIGN PATENT DOCUMENTS

CN    2875408 Y    3/2007
CN    202191023 U  4/2012
(Continued)

OTHER PUBLICATIONS

"4 wheeled trolley cart", https://www.amazon.com/WPCBAA-Universal-Four-Wheel-Retractable-Load-Bearing/dp/B07RB12R5L, 2020.
(Continued)

*Primary Examiner* — Jeffrey A Shapiro
(74) *Attorney, Agent, or Firm* — Fox Rothschild LLP; Carol E. Thorstad-Forsyth

(57) ABSTRACT

Systems and methods for operating a vending system for renting carts or strollers. The methods comprise: performing tag read operations or barcode scan operations by a device disposed at a lock mechanism of the vending system to obtain a unique identifier for a cart or stroller; selecting, by a computing device of the vending system, an image from a plurality of pre-stored images based on the unique identifier; displaying, by the computing device, the selected image along with other images as part of a graphical user interface facilitating cart or stroller rental; receiving, by the computing device, at least one user input for renting a cart or stroller associated with one of the displayed images; and performing operations by the computing device to cause a release of the lock mechanism that is locking the rented cart or stroller to the vending system.

48 Claims, 21 Drawing Sheets

(51) Int. Cl.
*G06Q 20/18* (2012.01)
*A47F 10/04* (2006.01)

(58) Field of Classification Search
CPC ............ G07F 17/0042; G07F 17/0057; G06Q 30/0645; A47F 10/04; B62B 5/0096
USPC .................................................. 194/211, 905
See application file for complete search history.

(56) References Cited

U.S. PATENT DOCUMENTS

| | | |
|---|---|---|
| 3,978,659 A | 9/1976 | Smith et al. |
| 3,978,959 A | 9/1976 | Muellner |
| 4,009,891 A | 3/1977 | Jensen |
| 4,381,870 A | 5/1983 | Muellner |
| 4,450,968 A | 5/1984 | Muellner |
| 4,538,719 A | 9/1985 | Gray et al. |
| D289,578 S | 4/1987 | Ruffin |
| D302,063 S | 7/1989 | Frazier et al. |
| 5,149,114 A | 9/1992 | Lewandowski et al. |
| D331,135 S | 11/1992 | Lewandowski et al. |
| 5,526,916 A | 6/1996 | Amdahl et al. |
| D396,918 S | 8/1998 | Golichowski et al. |
| 5,921,373 A | 7/1999 | Amdahl et al. |
| 6,024,203 A | 2/2000 | Amdahl et al. |
| 6,125,985 A | 10/2000 | Amdahl et al. |
| 6,142,283 A | 11/2000 | Amdahl et al. |
| 6,250,451 B1 | 6/2001 | Thirkill |
| D470,895 S | 2/2003 | Cole |
| D531,375 S | 10/2006 | Lauer et al. |
| D566,702 S | 4/2008 | Malone et al. |
| D607,948 S | 1/2010 | de Viveiros Ortiz |
| D611,047 S | 3/2010 | Smith et al. |
| 7,748,511 B1 | 7/2010 | Maher |
| 7,794,014 B2 | 9/2010 | Beall et al. |
| D626,544 S | 11/2010 | Bleck et al. |
| D658,721 S | 5/2012 | Yang |
| 8,272,491 B2 | 9/2012 | Khairallah et al. |
| 8,613,385 B1 | 12/2013 | Hulet et al. |
| D708,676 S | 7/2014 | Ballman et al. |
| D709,264 S | 7/2014 | Lee et al. |
| D716,792 S | 11/2014 | Raymonde Looze |
| D749,290 S | 2/2016 | Pollmann |
| D752,573 S | 3/2016 | Ballman et al. |
| D756,064 S | 5/2016 | Budde et al. |
| 9,418,345 B1 | 8/2016 | Meehan et al. |
| 9,471,918 B1 | 10/2016 | Krampe et al. |
| D782,465 S | 3/2017 | Chen et al. |
| D808,380 S | 1/2018 | Dillon et al. |
| D809,068 S | 1/2018 | Ballman et al. |
| D809,069 S | 1/2018 | Ballman et al. |
| 9,904,917 B2 | 2/2018 | Ruggiero et al. |
| D828,348 S | 9/2018 | Lee et al. |
| D841,643 S | 2/2019 | Dillon et al. |
| D843,366 S | 3/2019 | Koltsov |
| D871,498 S | 12/2019 | Kim |
| 2005/0101891 A1 | 5/2005 | Dehli |
| 2006/0103194 A1 | 5/2006 | Thalheimer |
| 2007/0040652 A1 | 2/2007 | Quatro |
| 2007/0205277 A1 | 9/2007 | Tashiro |
| 2008/0072509 A1 | 3/2008 | Eberhardt |
| 2008/0185888 A1 | 8/2008 | Beall et al. |
| 2009/0266673 A1* | 10/2009 | Dallaire ................. G07F 17/10 194/205 |
| 2011/0011930 A1 | 1/2011 | Starr et al. |
| 2011/0052357 A1 | 3/2011 | Torrison |
| 2012/0310425 A1 | 12/2012 | Kang |
| 2013/0030998 A1 | 1/2013 | Colley et al. |
| 2013/0046197 A1 | 2/2013 | Dlugos, Jr. et al. |
| 2014/0266594 A1* | 9/2014 | Reiser ................. G06F 3/04842 340/5.72 |
| 2015/0057837 A1 | 2/2015 | Moore, Jr. |
| 2015/0356801 A1 | 12/2015 | Nitu et al. |
| 2017/0015376 A1* | 1/2017 | Belman ................. A61G 5/128 |
| 2019/0088055 A1* | 3/2019 | Homad ..................... B62B 3/14 |

FOREIGN PATENT DOCUMENTS

| | | |
|---|---|---|
| CN | 203318207 U | 12/2013 |
| CN | 105701656 A | 6/2016 |
| DE | 202004017141 U1 | 1/2005 |
| ES | 2401012 A1 | 4/2013 |
| JP | 2000264213 A | 9/2000 |
| JP | 2017049777 | 3/2017 |
| JP | 2019051840 A | 4/2019 |
| KR | 101197587 B1 | 11/2012 |
| WO | 2013/045728 | 4/2013 |

OTHER PUBLICATIONS

Mitchell et al "Wheelchairs: What life care planners should know." Inn: Journal of Life Care Planning. 2005 Retrieved on Feb. 29, 2020 from <http://www.figeducation.com/nlcp/resources/section-1/Wheelchairs%20what%%20LCP%20Should%20know.pdf>.

"The Charger Chair", http://www.personal.psu.edu, Mar. 17, 2014, 1-8.

"Osaki: OS-7200H Ultra Curve 3D Deluxe Zero Gravity Massage Chair", http://www.themassagechair.com, Mar. 18, 2014, 1-7.

* cited by examiner

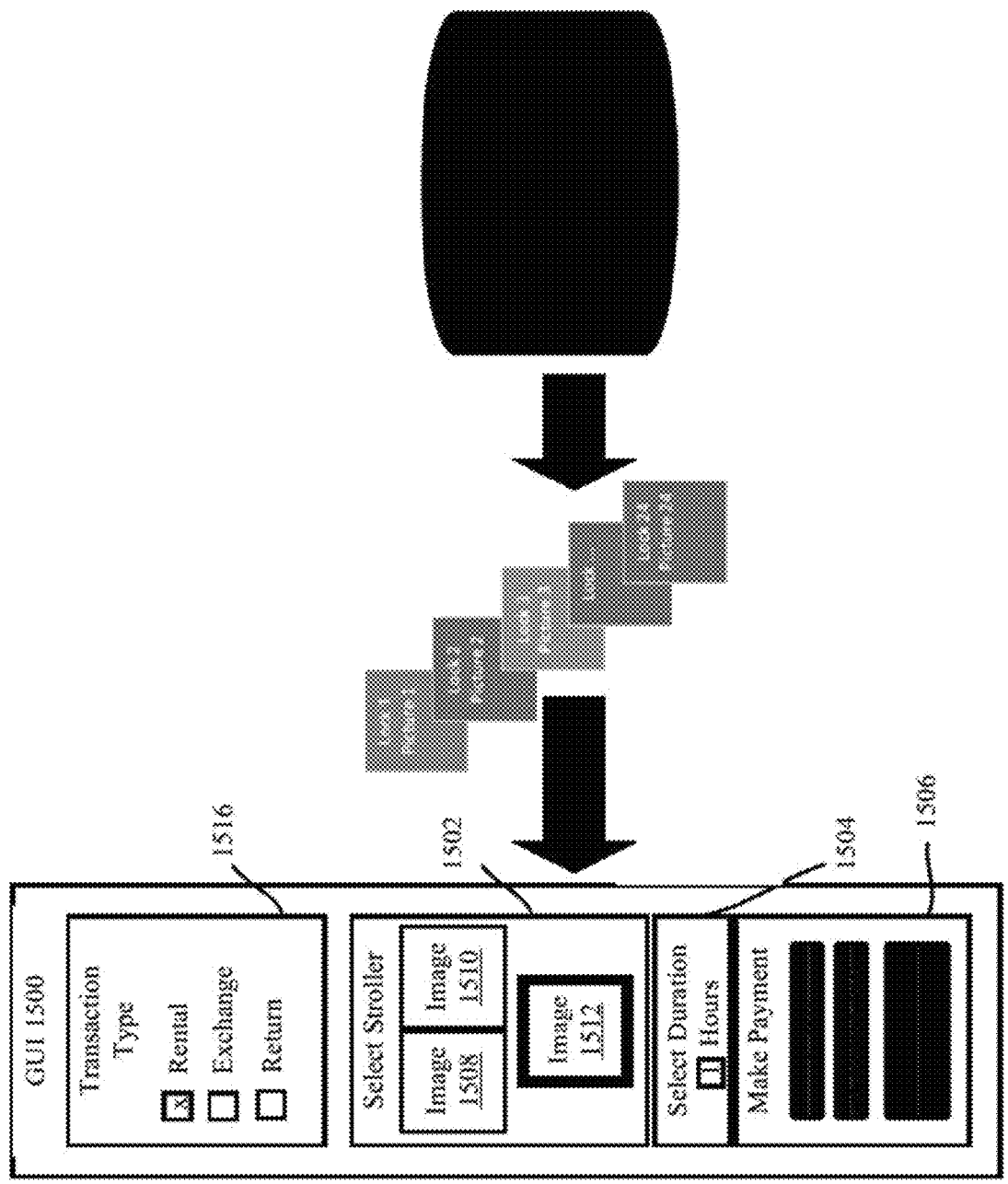

VENDING SYSTEM WITH SMART LOCK MECHANISMS

CROSS-REFERENCE TO RELATED APPLICATIONS

This application claims the benefit of U.S. Provisional Patent Application Ser. No. 62/794,185, filed Jan. 18, 2019. This provisional patent application is incorporated herein by reference in its entirety.

BACKGROUND

Statement of the Technical Field

The present disclosure relates generally to vending systems. More particularly, the present disclosure relates to implementing vending systems with smart lock mechanisms (e.g., for carts and/or strollers).

Description of the Related Art

Cart vending systems exist which allow customers to rent carts or strollers for use while shopping in facilities (e.g., at a mall). The cart vending systems are configured to dispense carts or strollers after payment has been received from the customers.

SUMMARY

The present disclosure concerns implementing systems and methods for operating a vending system for renting carts or strollers. The methods comprise: performing tag read operations or barcode scan operations by a device disposed at a lock mechanism of the vending system to obtain a unique identifier for a cart or stroller; communicating the unique identifier for the cart or stroller (e.g., from the docking rail) to the computing device of the vending system; selecting, by the computing device, an image from a plurality of pre-stored images based on the unique identifier; displaying, by the computing device, the selected image along with other images as part of a Graphical User Interface ("GUI") facilitating cart or stroller rental; receiving, by the computing device, at least one user input for renting a cart or stroller associated with one of the displayed images; and/or performing operations by the computing device to cause a release of the lock mechanism that is locking the rented cart or stroller to the vending system.

The carts or strollers may be stored in at least one row so as to have a side-by-side parallel arrangement. An elongate horizontal axis, that runs from a front of each cart or stroller to a back of each cart or stroller, may be angled 90° relative to a docking rail of the vending system. The device that performs the tag read operations or barcode scan operations may include, but is not limited to, a docking rail of the vending system to which the lock mechanism is coupled.

In some scenarios, the methods also comprise: using the unique identifier by the computing device to obtain rental transaction information for the cart or stroller; and dynamically updating the GUI to indicate an updated rental status of the cart or stroller, in response to an undocking of the cart or stroller from the vending system.

In those or other scenarios, the methods also comprise: receiving, by the lock mechanism or another lock mechanism, at least a portion of the cart or stroller which is being returned to the vending system; performing tag read operations or barcode scan operations by the lock mechanism or the another lock mechanism when the cart or stroller has been successfully received; using tag read data or barcode scan data to determine if a rental time for the cart or stroller has expired; causing actuation of the lock mechanism or the another lock mechanism to lock the cart or stroller to the vending system when a determination is made that the rental time for the cart has expired; dynamically changing the GUI to include a prompt for specifying a reason why the cart or stroller was return, when a determination is made that the rental time for the cart or stroller has not expired; causing actuation of the lock mechanism or the another lock mechanism to lock the cart or stroller to vending system based on the specified reason as to why the cart or stroller was returned; and/or disabling the lock mechanism or the another lock mechanism based on the specified reason as to why the cart or stroller was returned.

The methods may additionally or alternatively involve: dynamically changing the GUI to allow a user-input for selecting another cart or stroller, when a determination is made that the rental time for the cart or stroller has not expired; and/or performing operations by the computing device to cause a release of another lock mechanism in response to the user-input.

In those or other scenarios, the methods involve: enabling at least one electronic component of the cart or stroller when the cart or stroller is undocked from the vending system; and disabling the enabled at least one electronic component of the cart or stroller when the cart or stroller is re-docked at the vending system. The enabling and disabling is achieved via a wireless communication from the lock mechanism to the at least one electronic component of the cart or stroller. The electronic component(s) include, but is(are) not limited to, a device charger for charging personal devices.

In those or other scenarios, the methods involve: comprising deactivating operations of the lock mechanism for charging an energy storage device of the cart or stroller when the lock mechanism is released; and/or re-activating the operations of the lock mechanism for charging the energy storage device of the cart or stroller when the lock mechanism is re-locked. The energy storage device may be at least partially disposed in or on a downward protruding post of the cart or stroller that is capturable by the lock mechanism.

In those or other scenarios, the methods involve: comprising dynamically changing the GUI to include an additional image in response to a cart's or stroller's return to the vending system; dynamically changing the GUI to remove at least one image therefrom in response to a cart's or stroller's undocking from the vending system; and/or dynamically changing the GUI to remove at least one image therefrom in response to a detection of a defective lock mechanism, cart or stroller.

BRIEF DESCRIPTION OF THE DRAWINGS

The present solution will be described with reference to the following drawing figures, in which like numerals represent like items throughout the figures.

FIG. 15 is an illustration that is useful for understanding operations of a vending system in accordance with the present solution.

DETAILED DESCRIPTION

Figure 1:
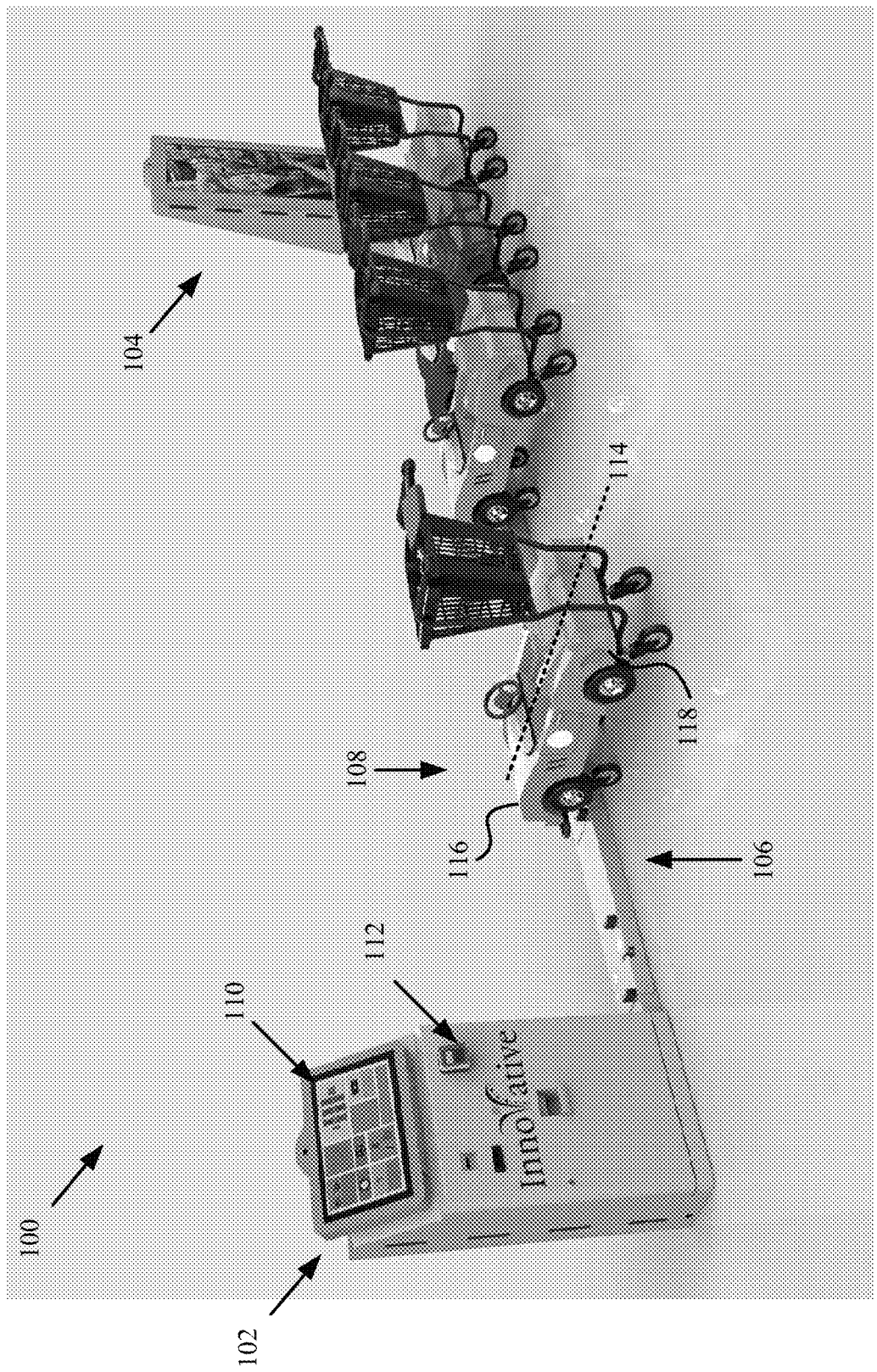
FIG. 1 is an illustration of an illustrative vending system configured to allow customers to rent strollers.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution concerns a vending system of the type that would be used to rent carts or strollers at facilities (e.g., malls, amusement parks, and/or other venues). The vending system comprises at least one smart lock component for selectively dispensing carts or strollers when certain criteria is met. The smart lock component described herein is not limited to vending system applications. It could also be used in many other applications such as locker applications, bike rental applications, handicap cart rental applications, and/or golf cart rental applications. The smart lock component is configured to dispense carts or strollers to paying customers. Payment can be received from the customer using a kiosk to which the smart lock component is attached and/or communicatively coupled. The kiosk includes a computing device that controls operations of the smart lock component when payment is successfully received and/or other criteria is met.

Illustrative Vending Systems

Figure 2:
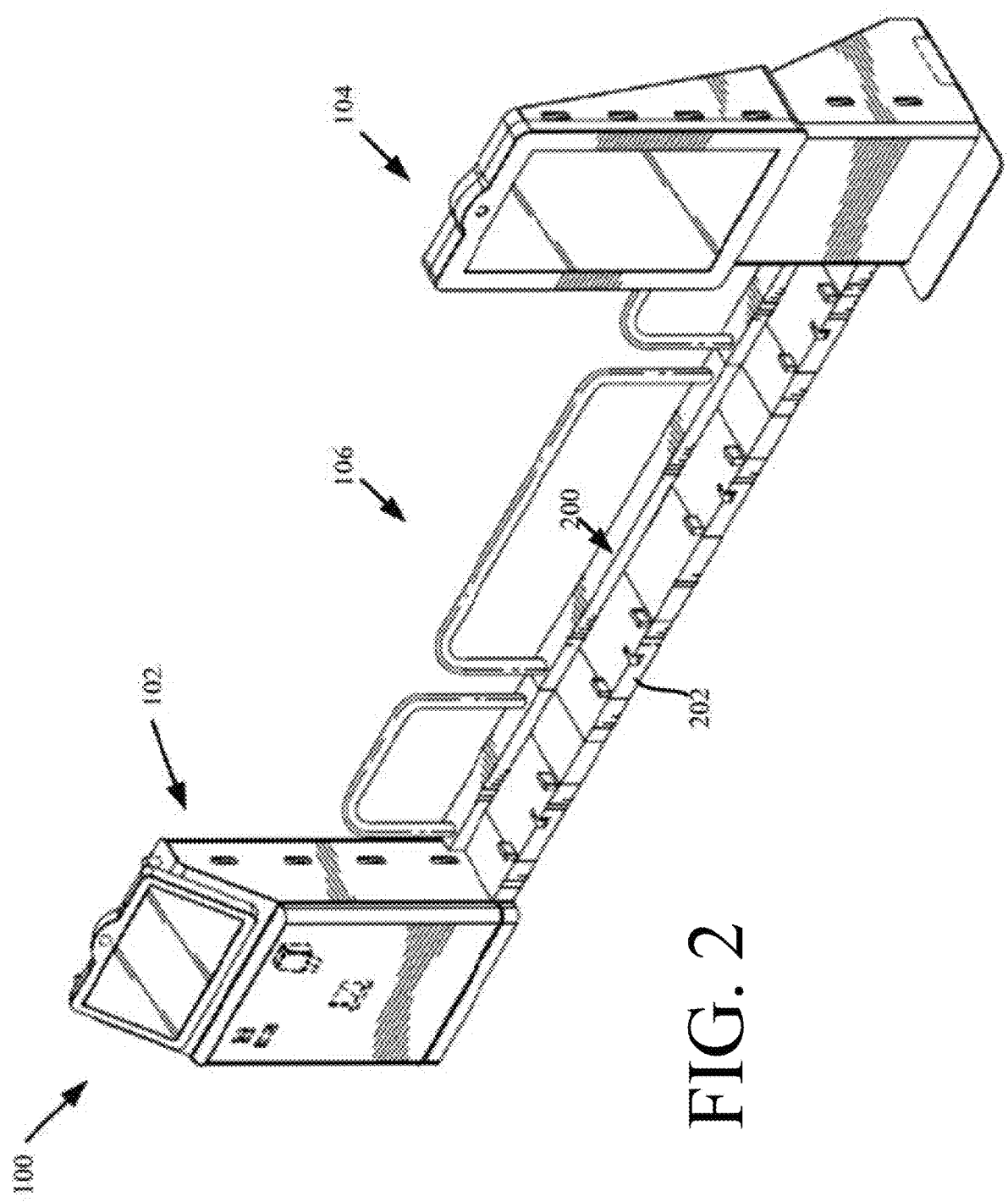
FIG. 2 is an illustration of the vending system shown in FIG. 1 with the strollers decoupled therefrom.

Referring now to FIGS. 1-2, there are provided illustrations of an illustrative vending system 100 in which the present solution is implemented. Vending system 100 comprises two kiosks 102, 104 between which a stroller dispensing structure 106 is disposed. The vending system 100 is generally configured to allow customers to rent strollers for use while shopping in facilities (e.g., at a mall or grocery store).

Kiosk 104 is configured to simply present various information to onlookers. This information includes, but is not limited to, advertisements, event announcements, weather notifications, and/or safety alerts. In some scenarios, this information comprises a plurality of media items (e.g., images, videos, icons, windows, etc.) that are displayed in a pre-set or pre-configured order. In other scenarios, this information is selected based on historical shopping data associated with a given individual who has been detected as being in proximity to system 100 (e.g., within 5-20 feet). The shopping data includes, but is not limited to, tracked paths of travel through a facility by the detected individual on one or more previous occasions, and/or detected items (or pieces of merchandise) placed in the individual's stroller on one or more previous occasions while traveling through the facility. The individual can be detected using an identifier received from a mobile communication device (e.g., a smart phone) in the individual's possession. The identifier can include, but is not limited to, a device identifier, a user name, a customer number, and/or an account number.

In contrast, kiosk 102 is configured to facilitate user-software interactions with the vending system 100. In order to facilitate the user-software interactions, kiosk 102 comprises a computing device 110 and payment means 112. Computing device 110 will be described in detail below. Still, it should be understood that computing device 110 comprises a touch screen that displays GUIs by which a user can be presented information, can be prompted for information, and/or can input information. The payment means 112 includes, but is not limited to, a credit card reader, a bank card reader, a contactless payment device (e.g., a Radio Frequency Identification ("RFID") or Near Field Communication ("NFC") based payment device), a coin receiver, a cash receiver, and/or a pre-paid subscription/membership base device. Each of the listed payment means is well known in the art, and therefore will not be described herein. Any known or to be known payment means can be used herein.

A plurality of strollers 108 are stored by the stroller dispensing structure 106. The strollers 108 are stored in a row so as to have a side-by-side parallel arrangement shown in FIG. 1. The strollers 108 may be angled 90° or less relative to a docking rail 200 of the stroller dispensing structure. More specifically, an elongate horizontal axis 114 (that runs from the front 116 of the stroller to the back 118 of the stroller) is angled 90° or less relative to a docking rail 200. The docking rail 200 is designed to give individuals the freedom to select any stroller 108 that (s)he wants to use at any given time. As such, the individual is not forced into taking the only available stroller as (s)he would do in a first-in, first-out vending system.

The docking rail 200 is designed to allow individuals to return defective, broken or inoperable strollers to the same or different kiosk, and exchange the same for another stroller. In this regard, it should be understood that docking rail 200 comprises an RFID tag reader and/or barcode scanner. RFID tag readers and barcode scanners are well known in the art, and therefore will not be described herein. Still, it should be understood that the RFID tag reader is generally configured to read RFID tags coupled to the strollers 108, and the barcode scanner is configured to read barcodes coupled to the strollers 108. The strollers 108 have unique identifiers associated therewith. The unique identifiers are communicated to the docking rail 200 via the RFID tag reads and/or barcode scans. The unique identifiers are provided from the docking rail 200 to the computing device 110 for processing. The processing is performed to obtain rental transaction information for the respective strollers. The rental transaction information can include, but is not limited to, a stroller model number, a stroller color, a stroller accessory type (e.g., a cup holder or a bag holder), the length of time a stroller was rented, and/or any detected damage caused to the stroller during one or more given rental time periods.

The stroller damage can be detected using one or more sensors that are physically coupled to the stroller and/or the kiosk. The stroller sensors can be configured to communicate with the RFID tag(s) such that sensor data can be stored in the RFID tag's memory and provided to the RFID tag reader. The kiosk sensors are communicatively coupled to the computing device 110 and/or a remote computing device (e.g., a server). The kiosk sensors can include, but are not limited to, cameras. The strollers sensors can include, but are not limited to, cameras, an accelerometer (e.g., for detecting if and when the stroller crashes into an object), a vibration sensor, and/or an orientation sensor to monitor the stroller's orientation (e.g., for detecting if and when the stroller rolls onto its side). The stroller sensors can communicate with the RFID tag coupled to the stroller, the RFID reader of the docking rail, and/or the computing device of the vending system.

In some scenarios, there is no time limit for a stroller rental. However, in other scenarios, time limits can be employed. Accordingly, an individual can be provided with an option to select or otherwise define a desired stroller rental time. In this case, the rental transaction information may also include, but is not limited to, information indicating the amount of time that a stroller has been rented by a given individual, the start time of the stroller rental, and/or an end time of the stroller rental.

Individuals are provided with the option to select another stroller within a pre-defined amount of time of successful payment for a stroller rental (e.g., within 35 second of successful payment). However, in other scenarios, individuals can additionally or alternatively return a broken stroller to the same or different kiosk during a stroller rental time and exchange it for another stroller. In this case, the rental transaction information is obtained from a local or centralized datastore, and analyzed to determine if a stroller rental time has or has not expired. If the stroller rental time has not expired when a stroller is returned to the vending system 100, then the individual is (a) prompted via the GUI of computing device 110 to specify a reason for the stroller's return, and/or (b) provided with an option to select another stroller from the plurality of docked or latched strollers for use during the remainder of the stroller rental time. A given stroller is dispensed when selected by the individual using the touch screen of the computing device 110.

The docked or latched strollers 108 are securely locked to the docking rail 200 via lock mechanisms 202. The lock mechanisms 202 will be discussed in detail below. Still, it should be understood that each lock mechanism 202 is released when certain criteria is met as determined by the computing device 110 of the kiosk 102. For example, a lock mechanism 202 for releasing a particular docked or latched stroller is actuated (A) when a successful payment transaction for renting the particular stroller has been completed via kiosk 102, (B) when an individual has arrived who reserved the particular stroller, (C) when an individual renting a stroller via the vending system 100 is a preferred customer or a customer associated with a customer loyalty program, and/or (D) when a user returns a broken stroller and selects the particular stroller during a paid for period of time for stroller use. Individuals can be identified by names, addresses, phone numbers, account numbers, customer loyalty codes, and/or identifying information (e.g., biometric characteristics, physical characteristics, and/or physiological characteristics). The biometric characteristics include, but are not limited to, facial features, finger prints, and/or iris features. The physical characteristics can include, but are not limited to, height, eye color, hair color, and posture. The physiological characteristics include, but are not limited to, age, sex and/or moods. Notably, in some scenario, certain ones of the strollers have restricted or limited use to only preferred customers and/or customers associated with a customer loyalty program.

In some scenarios, the strollers 108 comprise electronic components, such as lights, radios, display screens, sensors, a location device (e.g., a Global Positioning System ("GPS") device and/or a triangulation device) and/or device chargers (e.g., for mobile phones and/or tablets). Each of the listed electronic components are well known in the art, and therefore will not be described herein. The electronic components may be disabled when the strollers are docked and enabled when the strollers are undocked and/or payment for a rental thereof has been successfully received. In this way, individuals are unable to charge their personal devices (e.g., smart phones) via the vending system unless they have paid for a rental of one or more strollers. In some scenarios, the device charging capability is provided as a complimentary service to the stroller rental, and therefore is enabled in the manner recited above. However, in other scenarios, the device charging capability is enabled when the stroller is undocked only if a device charging fee was successfully paid in addition to the stroller rental fee.

Rechargeable batteries and/or other energy storage devices (e.g., capacitors) can be provided with the strollers 108 for supplying power the electronic components thereof. The batteries and/or energy storage devices are recharged via the docking rail 200. For example, in some scenarios, a cordless charging means is provided that uses an electromagnetic field to transfer energy between the docking rail 200 and the strollers 108. Such cordless charging means are well known in the art, and therefore will not be described herein. Any known or to be known cordless charging means can be used herein. The cordless charging means can be at least partially disposed in or on a downward protruding post of each stroller that is capturable by a lock mechanism 202 for locking the stroller to the docking rail 200. In other scenarios, the strollers 108 comprise energy harvesting circuits configured to capture energy for charging the batteries and/or energy storage devices from received RF energy or other forms of energy (e.g., heat, light, vibration, and/or magnetic field) provided by energy sources disposed in the docking rail 200. Such energy harvesting circuits are well known in the art, and therefore will not be described herein. Any known or to be known energy harvesting circuit can be used herein. The docking rail 200 can additionally or alternatively be designed to rotate at least the front wheels of the docked or latched strollers 108 for generating kinetic energy that can be used to recharge the batteries and/or energy storage devices. Techniques for rotating wheels are well known in the art, and therefore will not be described herein. Any known or to be known technique for rotating wheels can be used herein without limitation. The present solution is not limited to the particulars of these example and/or scenarios. Still, it should be noted that the cordless charging means, energy harvesting circuit, and/or wheel rotating mechanism may be disabled when a stroller is not locked to the docking rail by a respective lock mechanism and enabled when a stroller is locked to the docking rail by a respective lock mechanism.

Figure 3A:
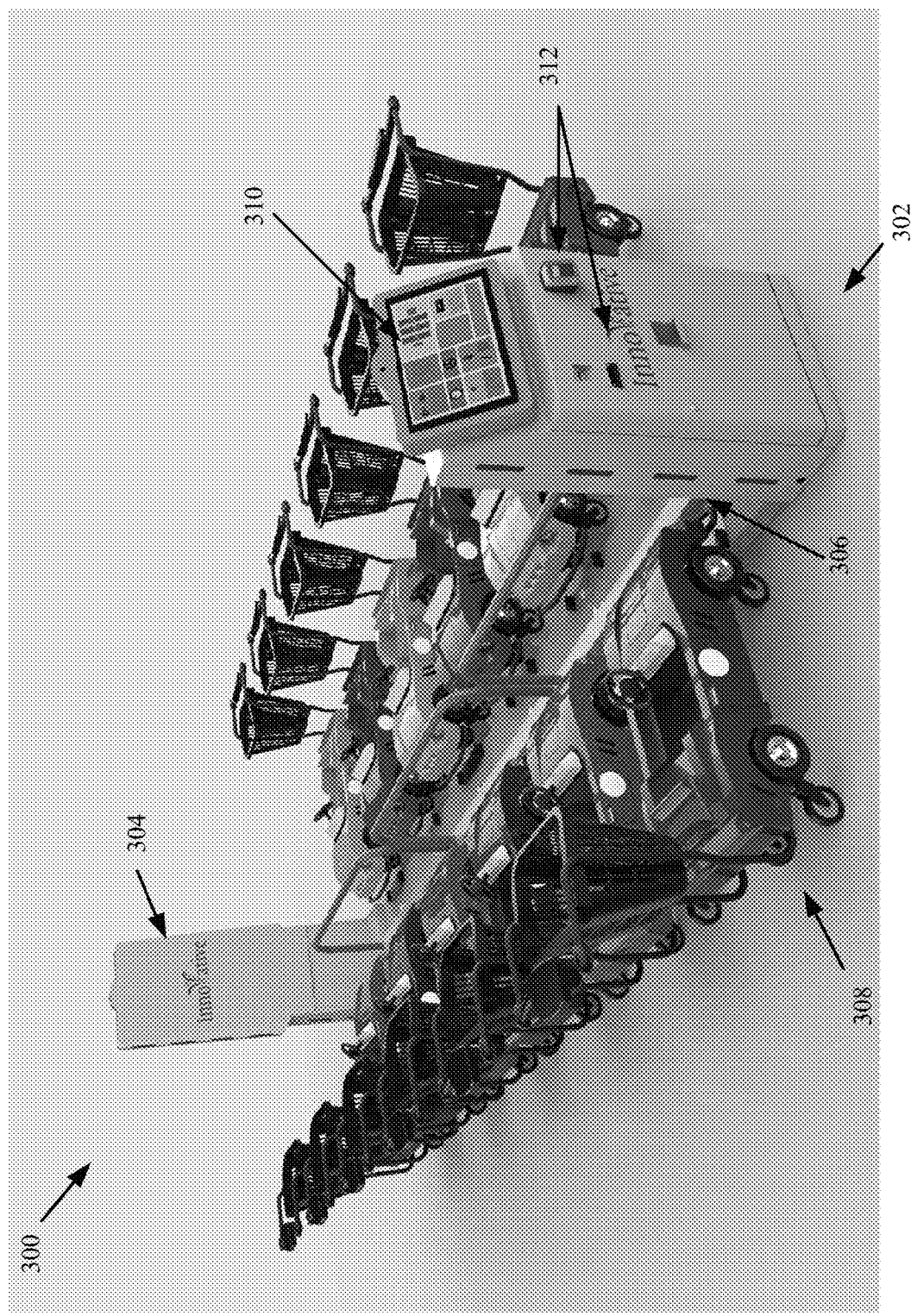
FIGS. 3A-3B (collectively referred to herein as "FIG. 3") provide illustrations of another illustrative vending system configured to allow customers to rent strollers.
Figure 3B:
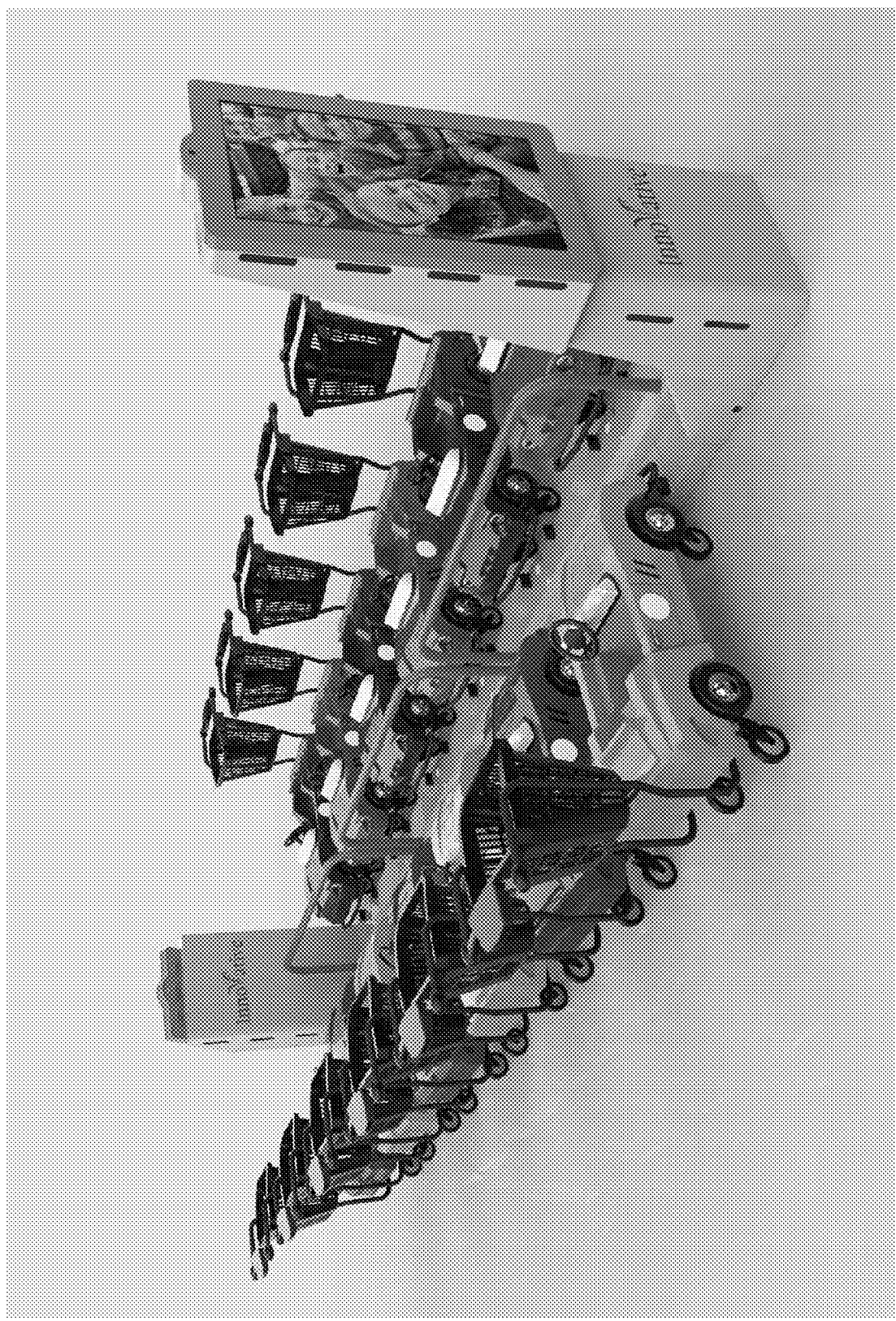
Figure 4:
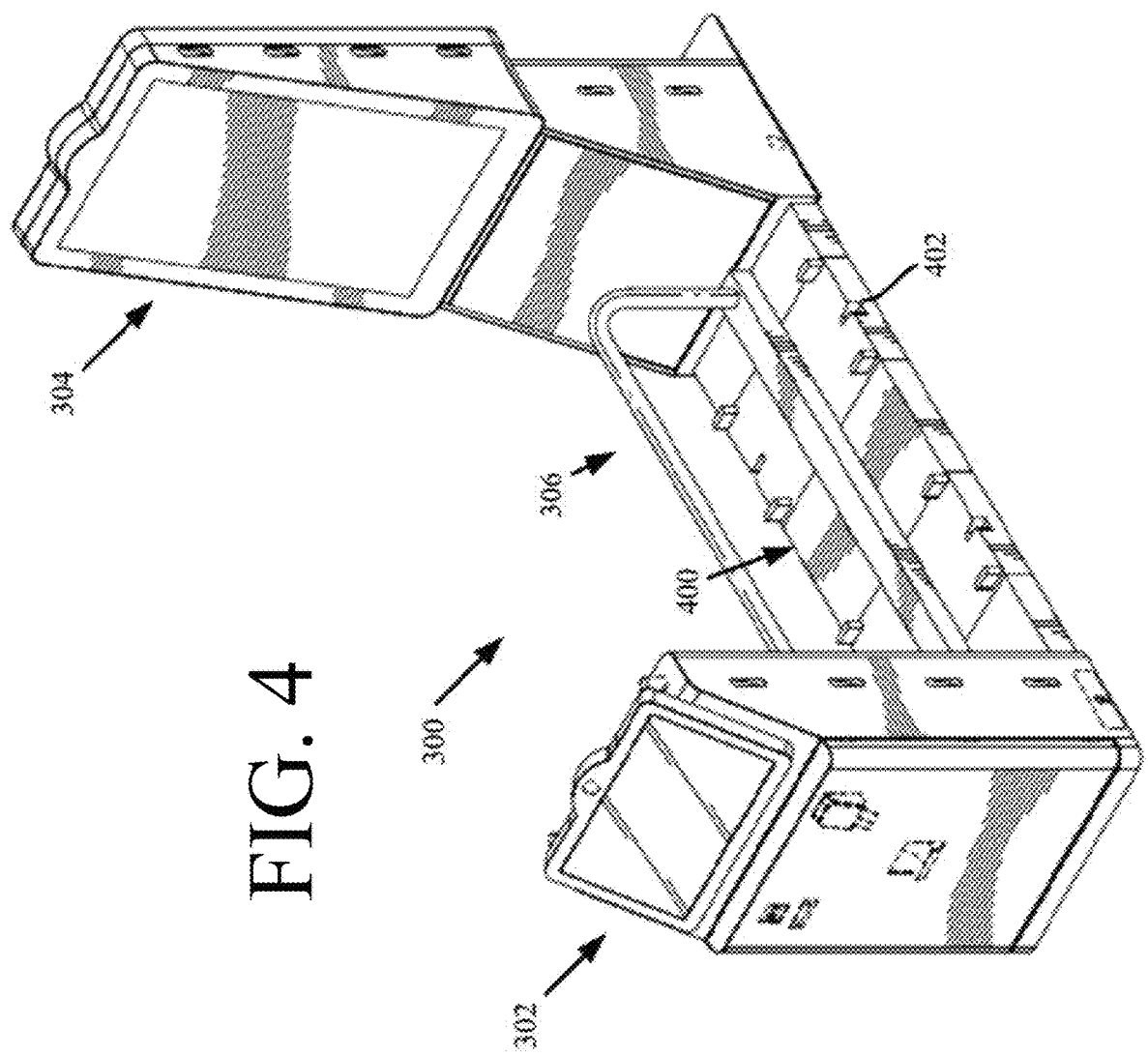
FIG. 4 is an illustration of the vending system shown in FIG. 3 with the strollers decoupled therefrom.

Referring now to FIGS. 3-4, there are provided illustrations of another illustrative vending system 300 in which the present solution is implemented. Like vending system 100, vending system 300 comprises two kiosks 302, 304 between which a stroller dispensing structure 306 is disposed. The vending system 300 is generally configured to allow customers to rent strollers for use while shopping in facilities (e.g., at a mall).

Kiosk 304 is configured to simply present various information to onlookers. This information includes, but is not limited to, advertisements, event announcements, weather notifications, and/or safety alerts. In some scenarios, this information is displayed in a pre-set or pre-configured order. In other scenarios, this information is selected based on historical shopping data associated with a given individual who has been detected as being in proximity to system 100 (e.g., within 5-20 feet). The shopping data includes, but is not limited to, tracked paths of travel through a facility by the detected individual on one or more previous occasions, and/or detected items (or pieces of merchandise) placed in the individual's stroller on one or more previous occasions while traveling through the facility. The individual can be detected using an identifier received from a mobile communication device (e.g., a smart phone) in the individual's possession. The identifier can include, but is not limited to, a device identifier, a user name, a customer number, and/or an account number.

In contrast, kiosk 302 is configured to facilitate user-software interactions with the vending system 300. In order to facilitate the user-software interactions, kiosk 302 comprises a computing device 310 and payment means 312. Computing device 310 will be described in detail below. Still, it should be understood that computing device 310 comprises a touch screen by which a user can be presented information, can be prompted for information, and/or can input information. The payment means 312 includes, but is not limited to, a credit card reader, a bank card reader, a contactless payment device (e.g., an RFID or NFC based payment device), a coin receiver, a cash receiver, and/or a biometric scanner. Each of the listed payment means is well known in the art, and therefore will not be described herein. Any known or to be known payment means can be used herein.

A plurality of strollers 308 are stored by the stroller dispensing structure 306. The strollers 308 are stored in two rows. In each row, the strollers have a side-by-side parallel arrangement. The strollers 108 may be angled 90° relative to a docking rail 400 of the stroller dispensing structure. The docking rail 400 is designed to give individuals the freedom to select any stroller 308 that (s)he wants to use at any given time. The individual does not have to take a single available stroller as (s)he would do in a first-in, first-out vending system.

The strollers 308 are securely locked to the docking rail 400 via lock mechanisms 402. The lock mechanisms 402 will be discussed in detail below. Still, it should be understood that each lock mechanism 402 is released when certain criteria is met as determined by the kiosk 302. For example, a lock mechanism 402 is released when a successful payment transaction for renting a stroller has been completed via kiosk 302, and/or when a user returns a broken stroller.

In some scenarios, an RFID functionality is built into kiosks 102, 302 that allows non-employees and/or others to be given RFID key tags. The RFID key tags allow these non-employees to remove all strollers from the vending system. This could be required for routine maintenance (e.g., polishing floors) or an event (e.g., the venue needs to bring automobiles through an entrance). The RFID key tag event is logged and locations of all strollers are tracked/logged until they are returned/locked to the vending system.

In some scenarios, the systems comprise a means for allowing customers to obtain access to assistance from remotely located individuals and/or systems. For example, this means can include a push button that activates a call to a call center, and/or a transceiver for establishing wireless communications between the rental system and a mobile device in the possession of the individual in proximity thereto. The communication can include, but is not limited to, a request for identifying information associated with the individual (e.g., a MAC address or loyalty number) and/or a command for the mobile device to place the call to the call center using information contained in the wireless communication from the rental system. The present solution is not limited to the particulars of this example.

Figure 5:
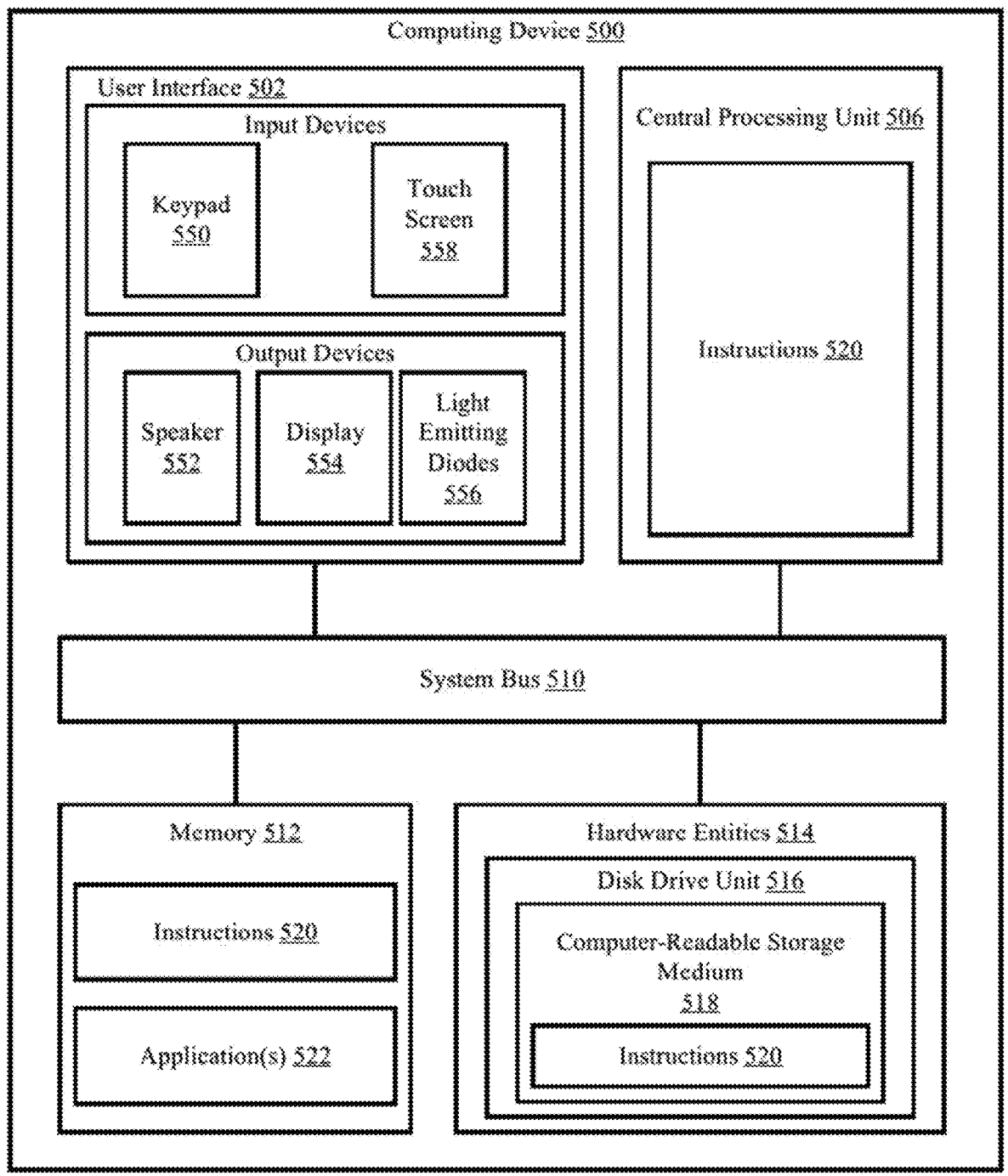
FIG. 5 provides a detailed block diagram of an exemplary architecture for a computing device.

Referring now to FIG. 5, there is provided a detailed block diagram of an illustrative architecture for a computing device 500. Computing device 110 of FIG. 1 and computing device 310 of FIG. 3 are the same as or substantially similar to computing device 500. As such, the following discussion of computing device 500 is sufficient for understanding computing device 110, 310. In some scenarios, the computing device 500 can be a centralized computing device residing in one of the kiosks (e.g., kiosks 102 or 104 of FIG. 1) or a distributed computing device at least partially residing in each kiosks. Alternatively, a computing device 500 can be included in each kiosk. Operations of the computing device 500 can be managed locally and/or remotely. In the remote scenarios, the computing device 500 may be communicatively coupled to a remote server via a network (e.g., the Internet or a cellular network).

Notably, the computing device 500 may include more or less components than those shown in FIG. 5. However, the components shown are sufficient to disclose an illustrative embodiment implementing the present solution. The hardware architecture of FIG. 5 represents one embodiment of a representative computing device configured to facilitate stroller rental via a vending system. As such, the computing device 500 of FIG. 5 implements at least a portion of a method for controlling a vending system and/or lock mechanisms thereof in accordance with the present solution.

Some or all the components of the computing device 500 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 5, the computing device 500 comprises a user interface 502, a CPU 506, a system bus 510, a memory 512 connected to and accessible by other portions of computing device 500 through system bus 510, and hardware entities 514 connected to system bus 510. The user interface can include input devices (e.g., a keypad 550 and/or a touch screen 558) and output devices (e.g., speaker 552, a display 554, and/or light emitting diodes 556), which facilitate user-software interactions for controlling operations of the computing device 500. The output devices can reside at one and/or both kiosks (e.g., kiosks 102, 104 of FIG. 1) of the system (e.g., system 100). The content presented by the display 554 can be dynamically changed based on the identity of and/or physical attributes of one or more individual(s) detected in proximity to the kiosk. The physical attributes can be determined based on camera data and/or biometric data.

At least some of the hardware entities 514 perform actions involving access to and use of memory 512, which can be a RAM, a disk driver and/or a Compact Disc Read Only Memory ("CD-ROM"). Hardware entities 514 can include a disk drive unit 516 comprising a computer-readable storage medium 518 on which is stored one or more sets of instructions 520 (e.g., software code) configured to implement one or more of the methodologies, procedures, or functions described herein. The instructions 520 can also reside, completely or at least partially, within the memory 512 and/or within the CPU 506 during execution thereof by the computing device 500. The memory 512 and the CPU 506 also can constitute machine-readable media. The term "machine-readable media", as used here, refers to a single medium or multiple media (e.g., a centralized or distributed database, and/or associated caches and servers) that store the one or more sets of instructions 520. The term "machine-readable media", as used here, also refers to any medium that is capable of storing, encoding or carrying a set of instructions 520 for execution by the computing device 500 and that cause the computing device 500 to perform any one or more of the methodologies of the present disclosure.

In some scenarios, the hardware entities 514 include an electronic circuit (e.g., a processor) programmed for facilitating the rental of strollers from a vending system and/or the dispensing of strollers from the vending system in accordance with the present solution. In this regard, it should be understood that the electronic circuit can access and run a software application 522 installed on the computing device 500. The software application 522 is generally operative to facilitate: the rental of strollers and/or respective device charging functions; the selective dispensing, undocking or unlatching of strollers; the selective actuation or release of lock mechanisms when certain criteria is met; the return of strollers; the exchange of strollers; the processing of RFID tag read information and/or barcode scan information to obtain rental transaction information for the respective strollers; the recharging of energy storage devices contained in the strollers; and/or the generation of analytical data. The analytical data can be used for dynamically selecting content to be displayed by the system, dynamically modifying stroller prioritization, dynamically changing rental pricing, and/or dynamically adjusting loyalty points. Other functions of the software application 522 will become apparent as the discussion progresses.

Referring now to FIGS. 6-12, there are provided illustrations of an illustrative lock mechanism 600. The lock mechanism 202 of FIGS. 1-2 and the lock mechanism 402 of FIGS. 3-4 are the same as or substantially similar to the lock mechanism 600. As such, the discussion of lock mechanism 600 is sufficient for understanding lock mechanisms 202, 402.

Figure 14:
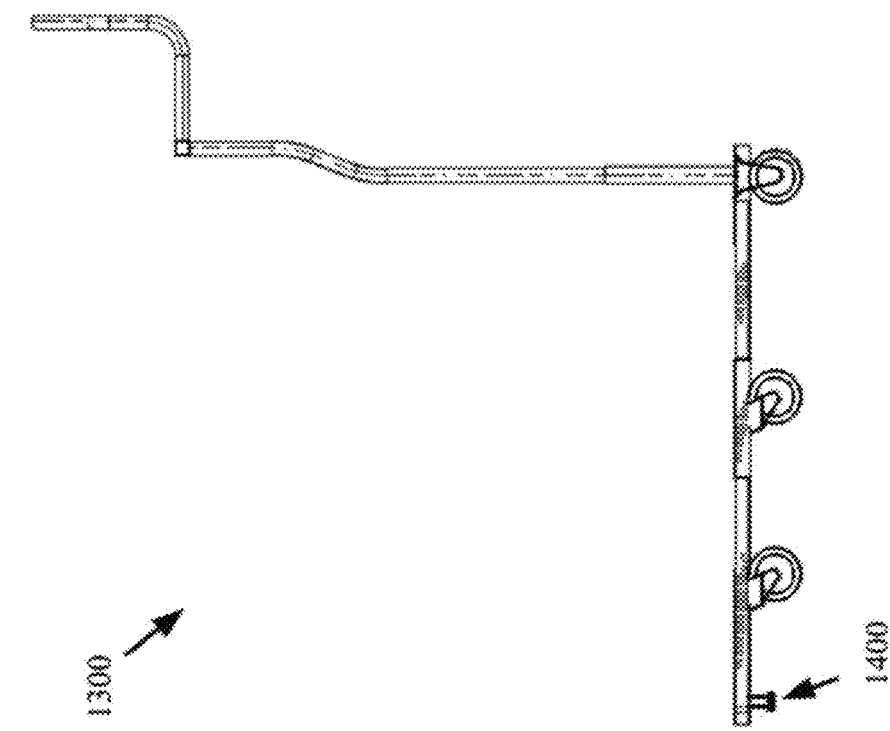
FIG. 14 is a side view of the stroller chassis shown in FIG. 13.
Figure 13:
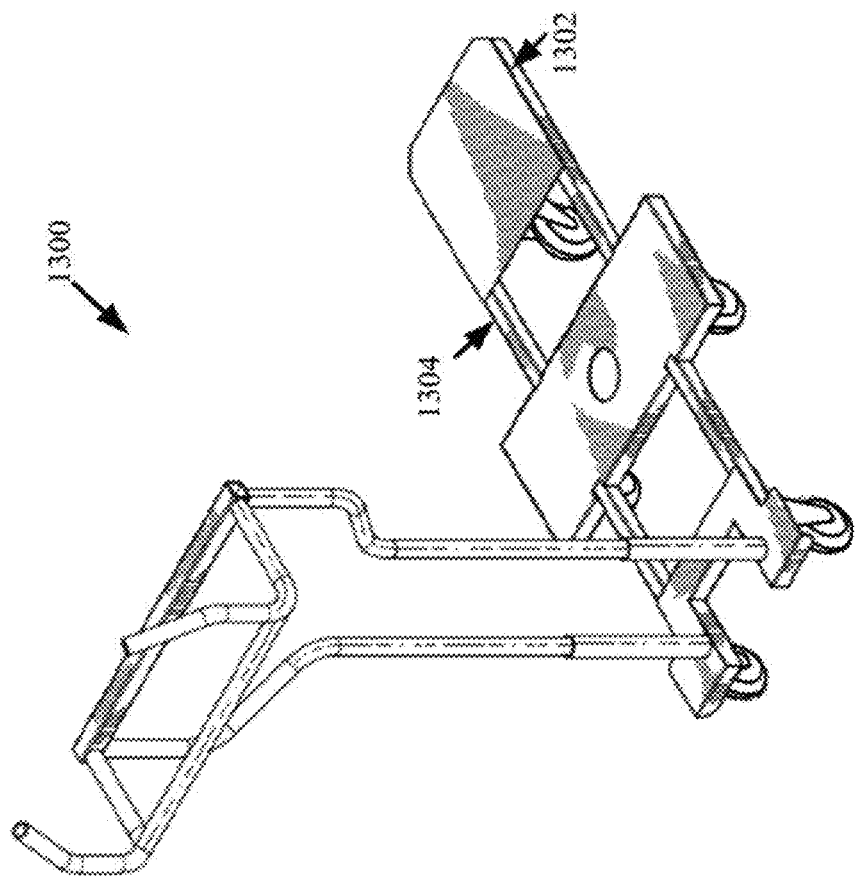
FIG. 13 is a perspective view of a stroller chassis.

Lock mechanism 600 comprises a top cover 602 from which two guide structures 604, 606 protrude out and away in an upward direction (e.g., out from the page). The guide structures 604, 606 guide a stroller such that it is properly aligned with the lock mechanism 600 when being returned or docked to a docking rail (e.g., docking rail 200 of FIGS. 1-2 and/or docking rail 400 of FIGS. 3-4). More particularly, the stroller is guided towards the lock mechanism 600 such that a post 1400 (shown in FIGS. 13-14) extending in a downward direction from a stroller chassis 1300 (shown in FIGS. 13-14) travels into an insert space 608 of the lock mechanism 600. In this regard, it should be understood that the guide structures 604, 606 slide against side rails 1302, 1304 (shown in FIGS. 13-14) of the stroller chassis 1300 when the stroller is being pushed into the lock mechanism 600.

The lock mechanism 600 also comprises a bottom cover 1200 covering a latch mechanism 700. The latch mechanism 700 is shown in a fully unengaged position in FIG. 7, a fully engaged position in FIG. 8, and a plurality of intermediary positions in FIGS. 9-11. As shown in FIGS. 7-11, the latch mechanism 700 pivots about a pivot point 704 in the clockwise direction 806 and counter clockwise direction 706. In this way, the latch mechanism 700 transitions between the fully unengaged position in FIG. 7 and the fully engaged position in FIG. 8 via intermediary positions of FIGS. 9-11.

Figure 7:
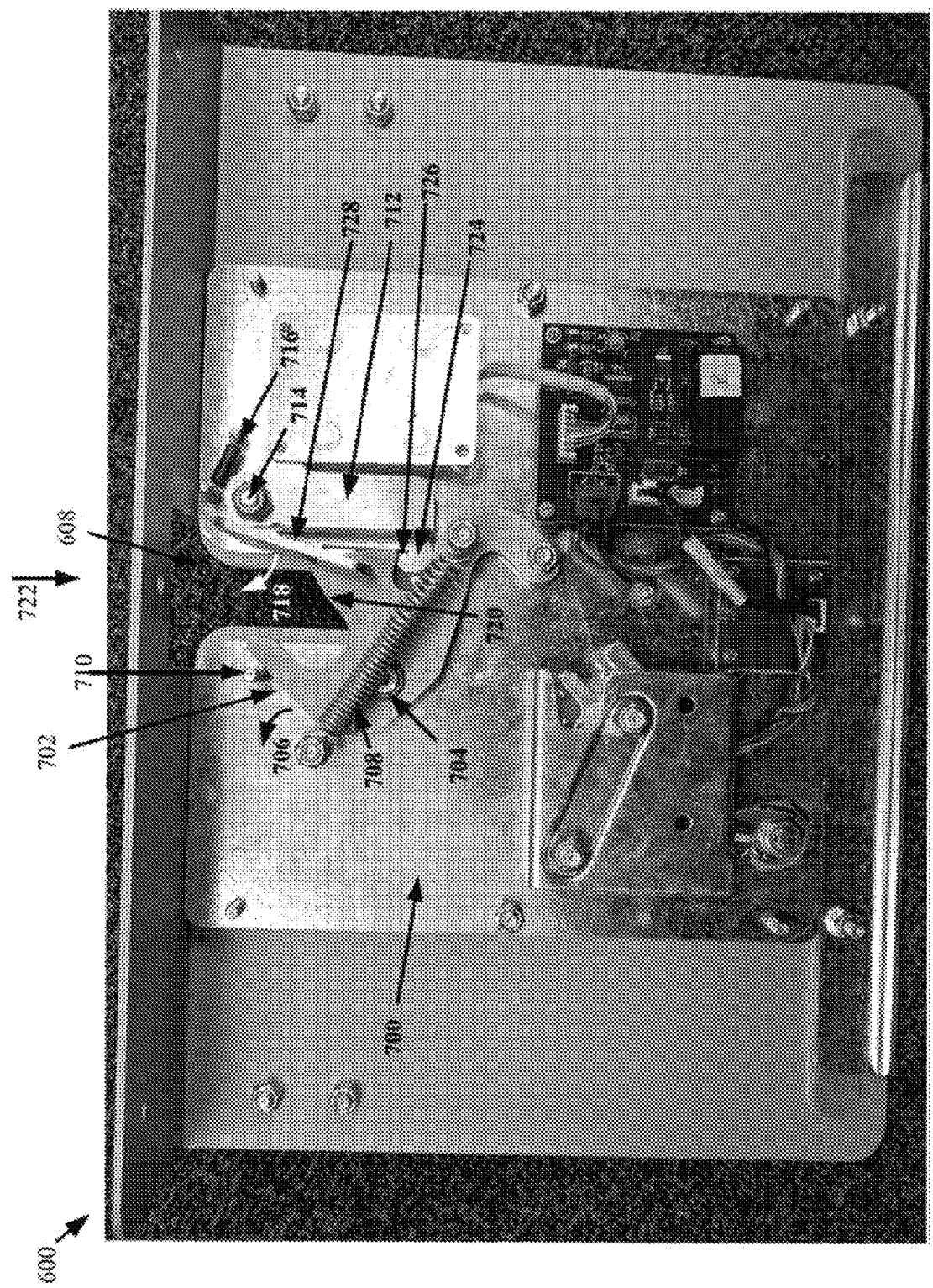
FIG. 7 is a bottom view of the illustrative lock mechanism shown in FIG. 6 with a cover removed therefrom and a latch in a fully unengaged position.
Figure 8:
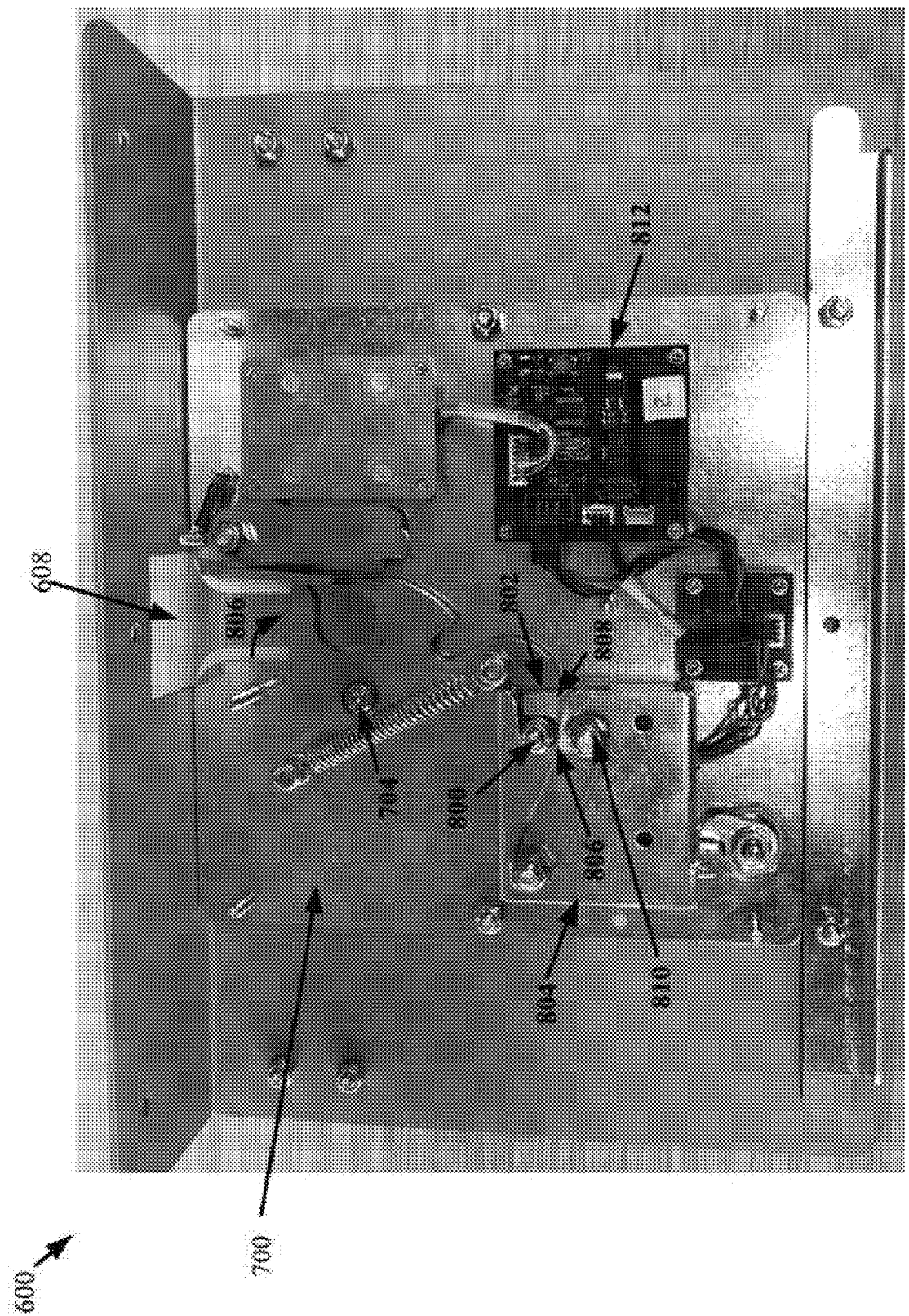
FIG. 8 is a bottom view of the illustrative lock mechanism shown in FIG. 6 with a cover removed therefrom and the latch in a fully engaged position.
Figure 9:
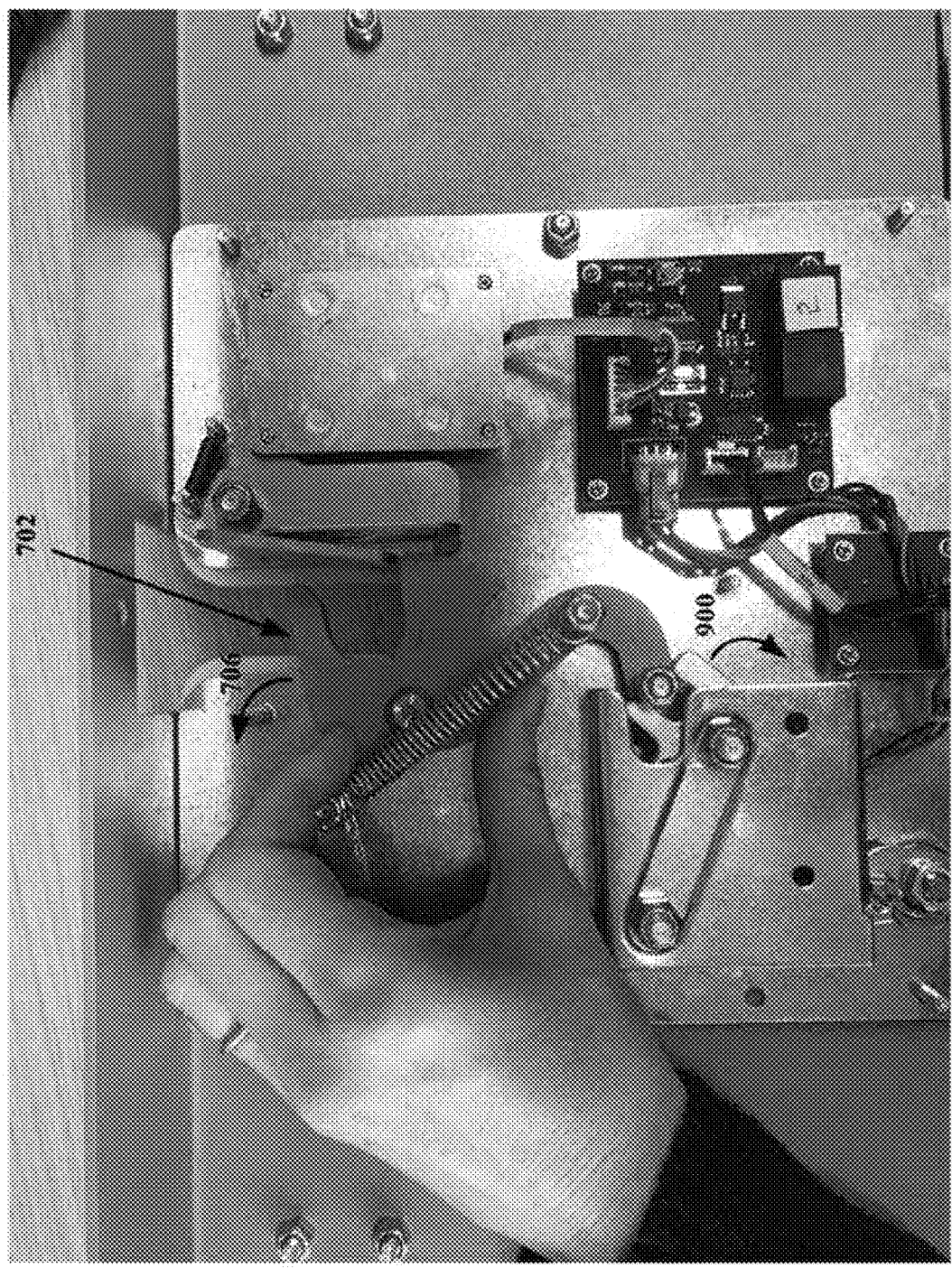
FIGS. 9-11 show the lock mechanism with the latch in a various intermediary positions.
Figure 10:
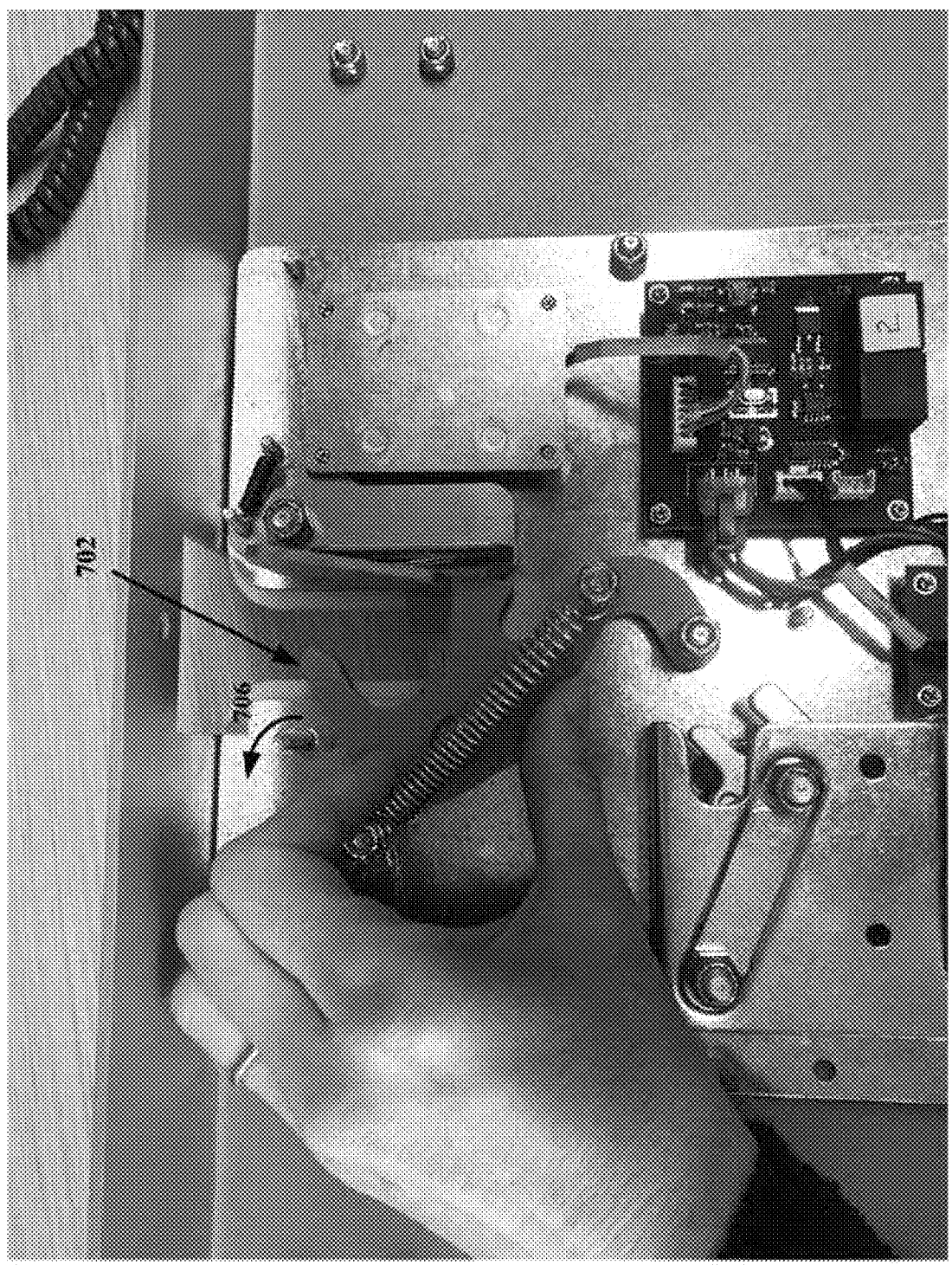
Figure 11:
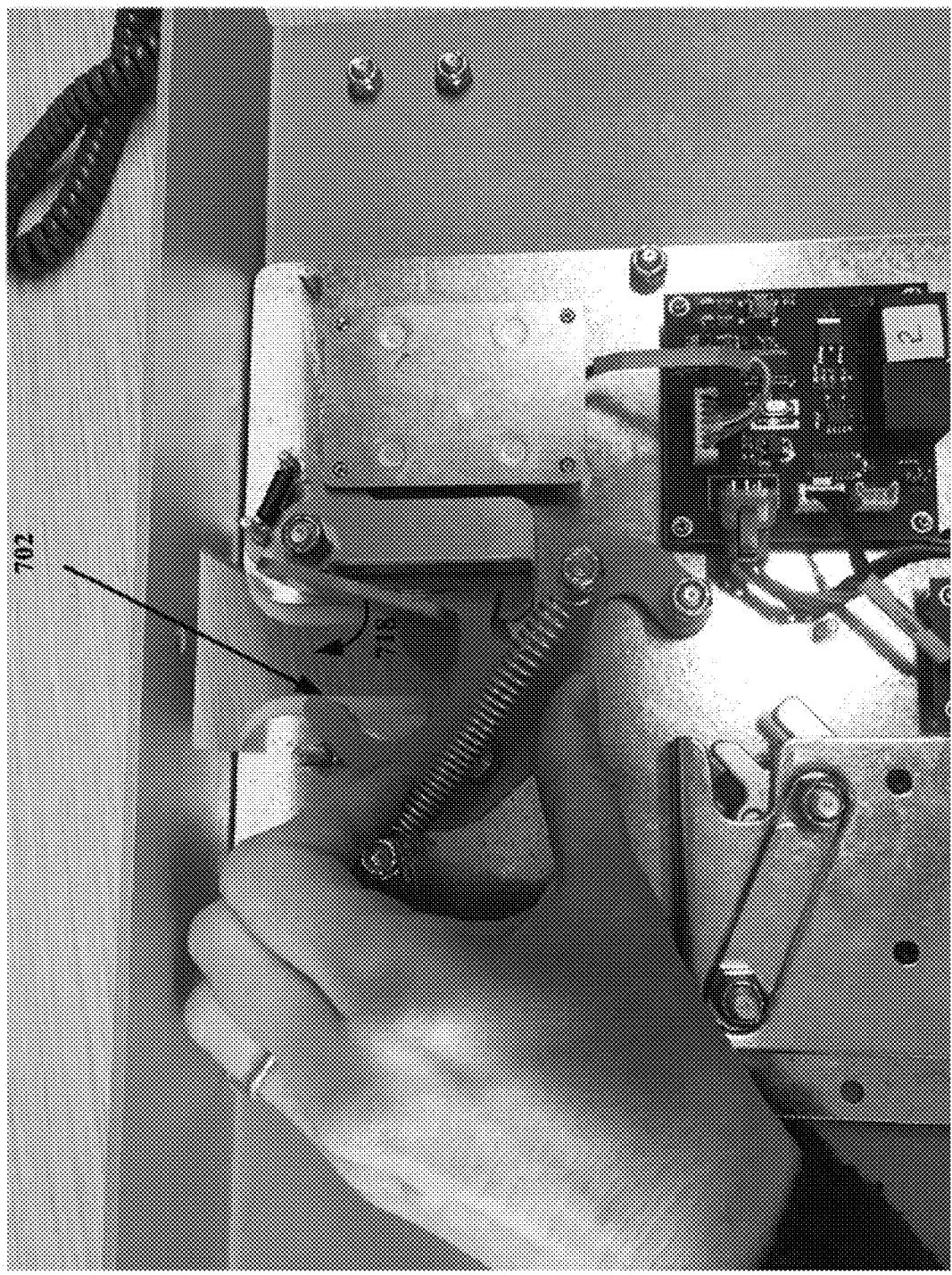
Figure 12:
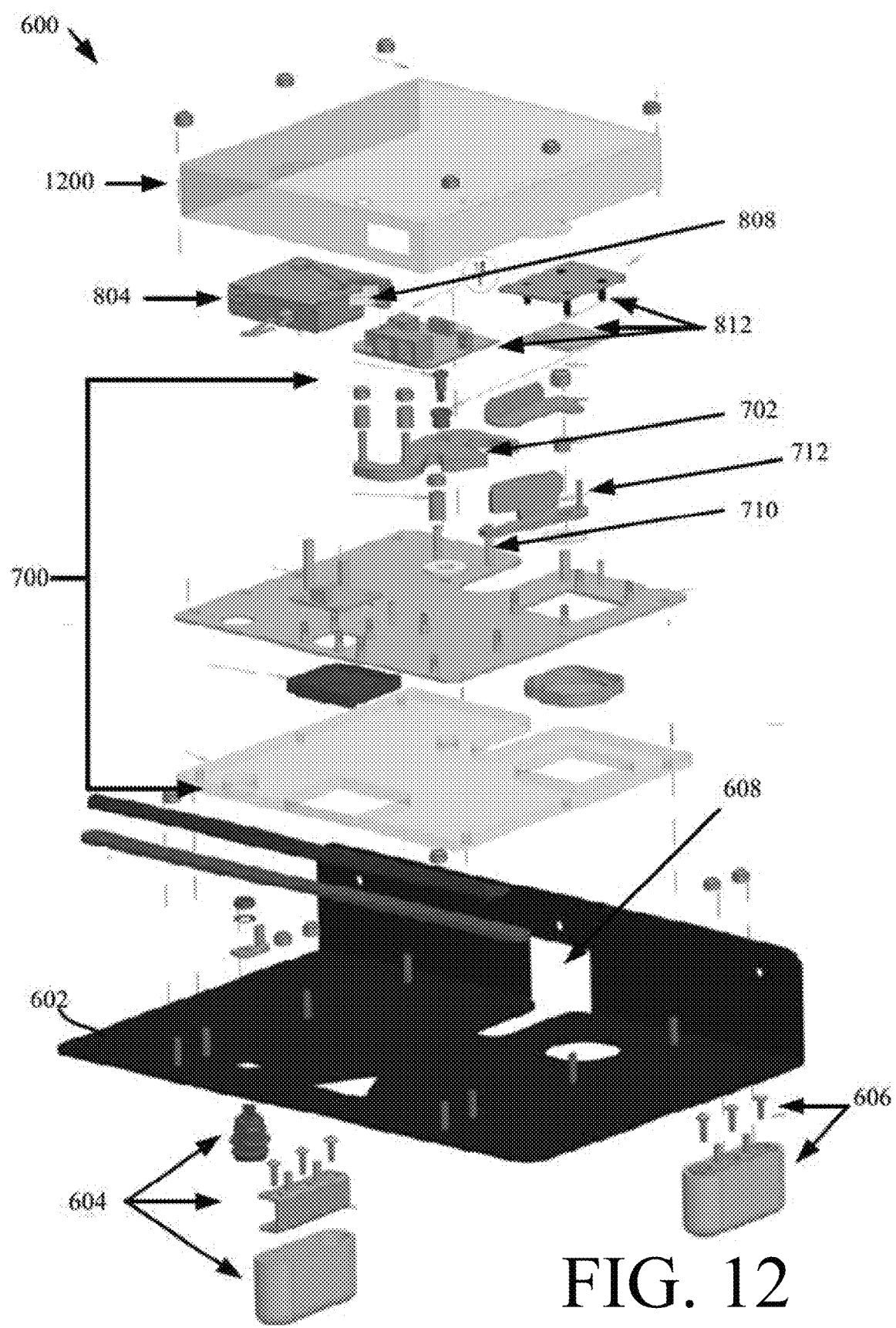
FIG. 12 is an assembly view of the lock mechanism shown in FIGS. 5-11.

In the fully unengaged position of FIG. 7, a latch 702 is rotated about a pivot point 704 in a counter clockwise direction 706. A resilient member 708 (e.g., a spring) provides tension to the latch 702 such that the latch 702 remains in its unengaged position until enough force is applied thereto by the post 1400 of the stroller chassis 1300 to cause the latch 702 to rotate about pivot point 704 in the counter clockwise direction 706. A stop structure 710 is provided that limits how far the latch 702 can rotate in the counter clockwise direction 706.

A safety mechanism 712 is provided that prevents the latch 702 from transitioning from its unengaged position to its engaged position when a person or animal inserts a hand, paw or other body part into insert space 608. In this regard, it should be understood that the safety mechanism 712 is pivotable about a pivot point 714 and is resiliently biased by a resilient member 716 in a direction 718. The resilient biasing causes the safety mechanism 712 to automatically rotate in direction 718 when a hook end 724 thereof is aligned with a slot 726 formed in the latch 702. As a result of the safety mechanism's rotation in direction 718, the hook end 724 engages a surface of the slot 726 so as to prevent the latch 702 from rotating in the counter clockwise direction 706.

When a stroller is being docked, the post 1100 of a stroller chassis 1000 comes in contact with a planar part 728 of the safety mechanism 712. The safety mechanism 712 rotates about pivot point 714 in direction away from the latch 702 as the post 1100 applies a pushing force on the planar part 728. Once the hook end 724 is rotated out of the slot 726 of the latch 702, a pushing force is applied by the post 1100 of the stroller chassis 1000 to a surface 720 of the latch 702. This pushing force causes the latch 702 to rotate about the pivot point 704 in a counterclockwise direction 806 until a post 800 of the latch 702 is fully inserted into insert space 802 of a lock mechanism 804.

As the post 800 travels into the insert space 802 it engages a securement part 808. When the post 800 applies a pushing force to the securement part 808, the securement part 808 is caused to rotate about pivot point 810 in a counterclockwise direction. The securement part 808 is locked in position when the post 800 is fully inserted into insert space 802. For example, a pin is moved by an actuator (e.g., a motor) into an aperture formed through the securement part 808 so as to prevent rotation of the securement part 808 in a clockwise direction. In this way, the securement part 808 retains the latch 702 in its fully engaged position.

The securement part 808 is released when the vending system (e.g., vending system 100 of FIG. 1-2 or 300 of FIGS. 3-4) determines that certain criteria is met such that a stroller can be pulled out and away from the lock mechanism 600. An electronic circuit 812 is provided to facilitate communications to/from a computing device (e.g., computing device 110 of FIG. 1-2 or 310 of FIGS. 3-4) of the vending system, and to facilitate the selective unlocking of the securement part 808 when certain criteria is met.

Figure 6:
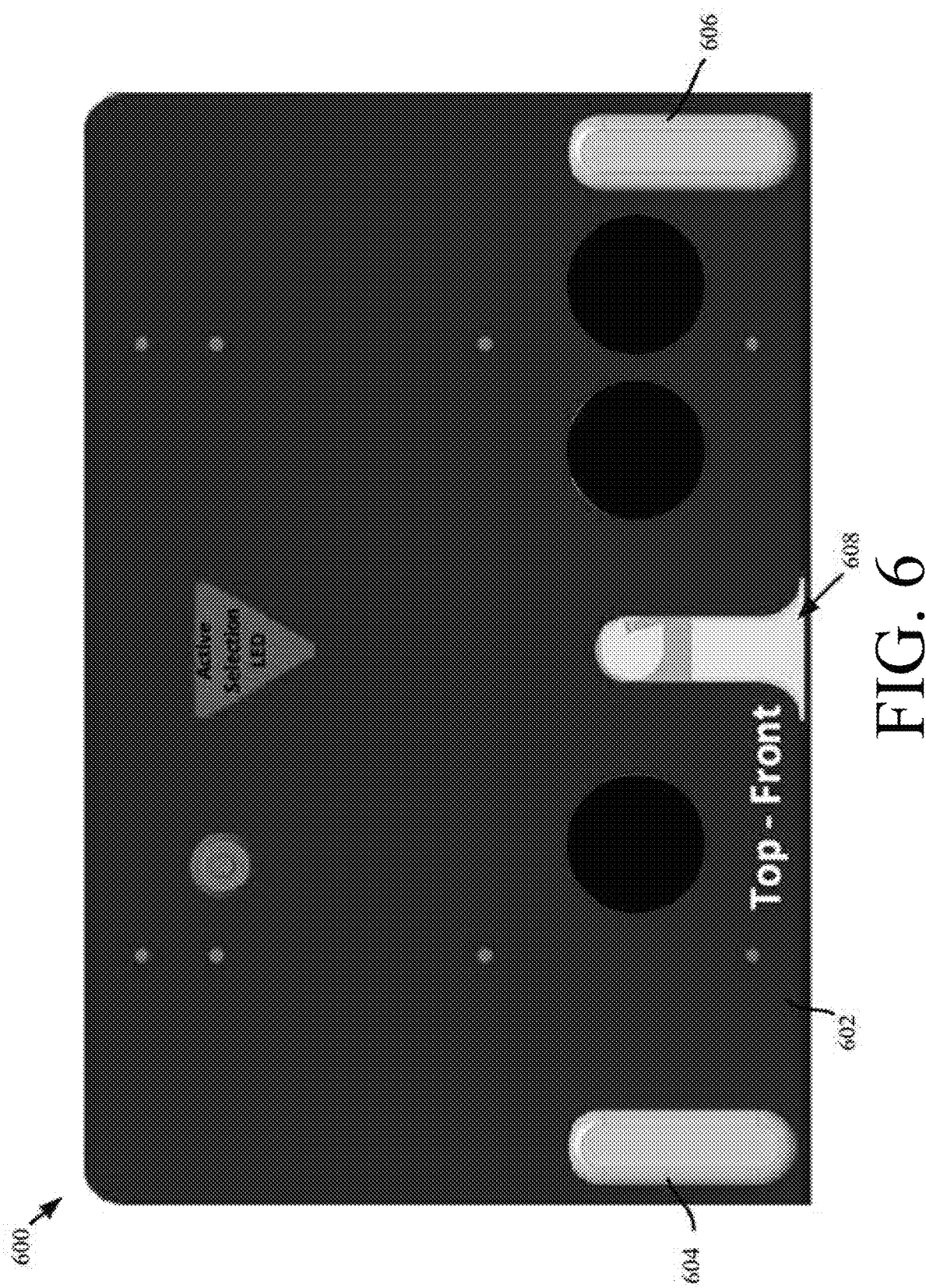
FIG. 6 is a top view of an illustrative lock mechanism.

The electronic circuit 812 may also comprise a tag reader 610, a barcode scanner 612 and/or a charger 614 as shown in FIG. 6. The tag reader 610 is generally configured to read RFID tags coupled to the strollers (e.g., on the bottom of the stroller chassis 1300). The barcode scanner 612 is configured to read barcodes coupled to the strollers (e.g., on the bottom of the stroller chassis 1300). The charger 614 is configured to transfer energy between the lock mechanism 600 and a stroller for charging a battery and/or other energy storage device of the stroller.

The electronic circuit 812 may further comprise sensors to detect when the lock mechanism 600 is not operating properly, disable operations for locking/unlocking the lock mechanism 600 until a trigger event occurs (e.g., a status bit is changed), and/or send a notification of such detection to the computing device of the vending system so that it can be taken offline until repaired.

Referring now to FIG. 15, there is provided an illustration that is useful for understanding operations of the vending systems 100, 300 described above. The vending systems 100, 300 include hardware and software configured to facilitate stroller rentals by individuals. In this regard, a GUI 1500 is presented to individuals by computing systems 110, 310 of the vending systems 100, 300.

The GUI 1500 includes a portion 1516 comprising widgets (e.g., selection boxes, drop down boxes, virtual buttons, etc.) that allow an individual to select a type of transaction. The transactions include, but are not limited to, a rental transaction for renting one or more strollers, an exchange transaction for exchanging a rented stroller with another stroller for the duration of the rental period, and a return transaction for returning a stroller.

The GUI 1500 also includes a portion 1502 comprising a plurality of selectable images 1508-1512. The images include, but are not limited to, images showing the strollers which are currently docked in a docking rail 200, 400 of the vending system 100, 300 and/or are currently available for rental. A stroller is currently available for rental when it has not been identified as a damaged stroller (e.g., by a customer and/or by machined learned information based on sensor data generated by sensors coupled to the strollers and/or kiosk), it has not been reserved by another individual, it can be used by any individual, and/or it can be used by people having a customer level that is the same as or lower than that of the individual trying to rent the stroller(s). An individual can select one or more images 1502-1506 at any given time to initiate a stroller rental transaction. In some scenario, an individual can only select one image at a time for stroller rental. If the individual wants to rent another stroller, (s)he will have to repeat the rental transaction process for renting a stroller. In other scenarios, an individual can perform one rental transaction for any number of stroller rentals.

In some scenarios, one or more images can be grayed out to show that they are not selectable at this time. For example, an image of a stroller that is only available to preferred customers is grayed out and non-selectable when a non-preferred customer is trying to rent a stroller. Additionally or alternatively, an image of a stroller that has been reserved may be grayed out when a person other than the person who made the reservation is trying to rent a stroller. The present solution is not limited in this regard.

The displayed images dynamically change as strollers 108, 308 are returned to and removed from the vending system. In this regard, it should be noted that the images can be selected and added to the GUI 1500 based on tag read data and/or barcode scan data acquired by the lock mechanisms 202, 402, 600 of the vending systems. Also, images can be removed from the GUI 1500 when the respective strollers are undocked from the vending systems. A stroller is determined to be undocked when the respective lock mechanism has been released, and/or the lock mechanism's release has been verified (e.g., based on movement of the stroller away from the docking system and/or a change in the stroller's geographic locations relative to the docking system). The images are stored in a datastore 1514 and made accessible to the vending systems 110, 300. The datastore 1514 can be a local datastore (e.g., memory 512 of FIG. 5) or a remote datastore (e.g., a database).

In some scenarios, the locations of rented strollers are detected and tracked through the facility. The RFID tags, barcodes and/or beacons disposed on the rented strollers may be used for this purpose. Accordingly, tag readers, barcode scanners and/or beacon signal receiving devices are strategically placed with in the facility. When a stroller comes in proximity to one of these tag readers, barcode scanners and/or beacon signal receiving devices, the unique identifier associated with the RFID tag and/or stroller is acquired. Each unique identifier is communicated to the vending system 100 or 300 along with a timestamp and a unique identifier for the tag reader or barcode scanner. The strollers location is then determined based on the known location of the tag reader, barcode scanner and/or beacon signal receiving devices. In some scenarios where an individual can select a time period for stroller rental, the stroller location information may also be displayed on the GUI along with an expected time of the stroller's return to the vending system such that other individuals can have the option to wait for the stroller's return before performing a stroller rental transaction. The present solution is not limited to the particulars of these scenarios. For example, the locations of rented strollers may additionally or alternatively detected and tracked through a facility using GPS devices and/or other location devices coupled to the strollers.

In some scenarios, there is no time limit for a stroller rental. However, in other scenarios, time limits can be employed. Accordingly, the GUI 1500 may optionally include a portion 1504 that allows an individual to select or otherwise specify a desired duration for stroller rental. The GUI 1500 further includes a third portion 1506 that allows an individual to start and complete a payment transaction for renting one or more strollers. Payment can be made by cash, credit card, loyalty points and/or other payment means.

The loyalty points can be issued to individuals based on their use of the vending system(s) 100, 300 and/or other vending equipment available at the facility. The loyalty points can be used to determine a rental fee for a stroller by a particular individual. Stated differently, the individual can use the loyalty points collected from his(her) history of stroller rentals and/or use of other vending equipment (e.g., metered massage chairs, food vending machines, small electronic vending machines, etc.) located at any venue under the loyalty program.

Once a successful payment has been made, the lock mechanism 202, 402 or 600 associated with the stroller shown in the selected image 1512 is unlocked such that the stroller can be undocked and removed from the vending system 100 or 300. If the stroller has not been undocked in a given amount of time (e.g., 3 minutes) starting from the time of successful payment, then the lock mechanism is once again locked and the individual is reimbursed for the payment amount.

Illustrative Methods for Operating a Vending System

Figure 16:
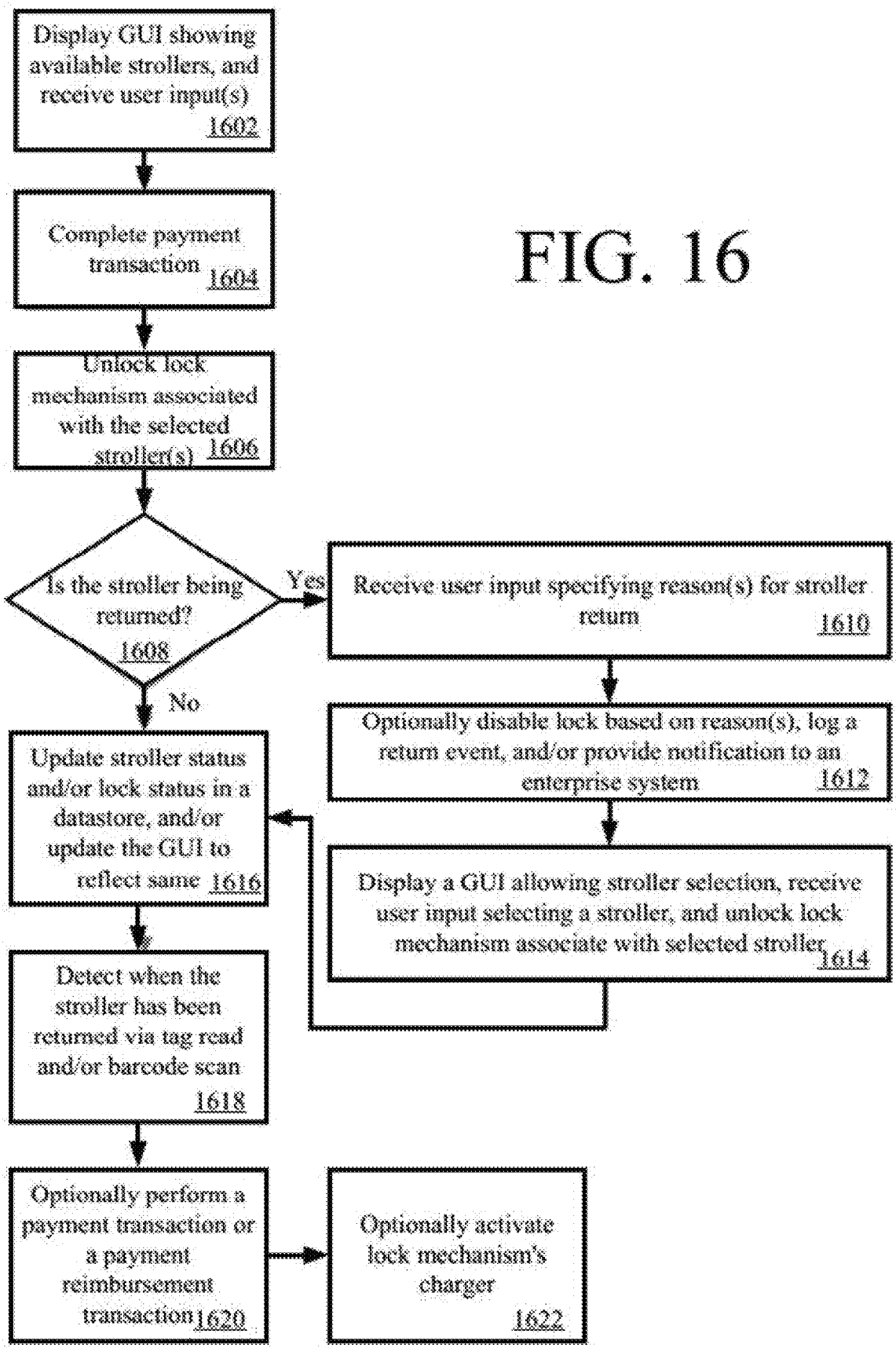
FIG. 16 is a diagram that is useful for understanding operations of a vending system in accordance with the present solution.

FIG. 16 is a diagram that is useful for understanding operations of a vending system in accordance with the present solution. As shown in block 1602, a stroller rental transaction begins when user inputs are received by a vending system (e.g., vending system 100 of FIG. 1 or 300 of FIG. 3) from an individual via a GUI (e.g., GUI 1500 of FIG. 15) displayed on a display (e.g., display 554 of FIG. 5) thereof. The user inputs can include, but are not limited to, a user input selecting a type of transaction, a user input for selecting one or more strollers, a user input for specifying a duration for rental of the selected stroller(s), a user input for selecting a device charging service, and/or a user input for making a payment.

In block 1604, operations are performed by the vending system to complete the payment transaction. Methods for completing payment transactions are well known in the art, and therefore will not be described herein. Any known or to be known method for completing a payment transaction can be used herein without limitation.

In block 1606, operations are performed by the vending system to unlock a lock mechanism (e.g., lock mechanism 202, of FIGS. 1-2, 402 of FIG. 3-4, or 600 of FIGS. 6-12) associated with the selected stroller. These operations involve: communicating an unlock command from a computing device (e.g., computing device 110 of FIG. 1, 310 of FIG. 3 and/or 500 of FIG. 5) to an electronic circuit (e.g., electronic circuit 812 of FIG. 8) of the lock mechanism; and releasing a securement part 808 of the lock mechanism in response to the unlock command.

In some cases, the individual may want to return the stroller as shown by block 1608. Block 1608 involves receiving by the vending system a user input indicating that (s)he desires to return the stroller. In block 1610, the vending system can also receive a user input specifying why the stroller is being returned. If the reason raises a safety concern regarding the returned stroller, then the vending system can re-secure the securement part 808 of the lock mechanism, disable the lock mechanism, log the return event, and/or provide notification of the same to an enterprise system such that the stroller can be serviced as shown by block 1612.

Upon completing 1610 and/or 1612, the process continues to 1614 where a GUI is presented to the individual that allows the same to select another stroller. The vending systems receives a user input selecting a stroller and performs operations to unlock the lock mechanism associated with the newly selected stroller.

Once a stroller has been undocked and removed from the vending system, operations of block 1616 are performed by the vending system for updating a stroller status in a datastore (e.g., memory 512 of FIG. 5), updating a lock mechanism's status in the datastore, and/or updating the GUI to reflect the stroller/lock status change.

In 1618, the vending system detects when the stroller has been returned. This detection is made using RFID tag read data generated by a tag reader of the lock mechanism and/or barcode scan data generated by a barcode scanner of the lock mechanism. At this time, the vending system checks whether any additional payment is needed for the stroller rental (e.g., when the stroller was not returned at all or not returned in the paid-for-rental time period) and/or whether the individual should be reimbursed for any overpayment. In some scenarios, reimbursement only occurs if a stroller rental transaction is cancelled or otherwise terminated. In other scenarios, a reimbursement may also occur when the stroller is returned prior to expiration of the paid-for-rental time period. In some scenarios, the vending system performs a payment transaction or a payment reimbursement transaction as shown by block 1620.

The vending system can also cause the lock mechanism's charger to be activated in block 1622 such that the energy storage device(s) of the stroller are charged. The charger can be deactivated when the lock mechanism is once again unlocked.

Figure 17A:
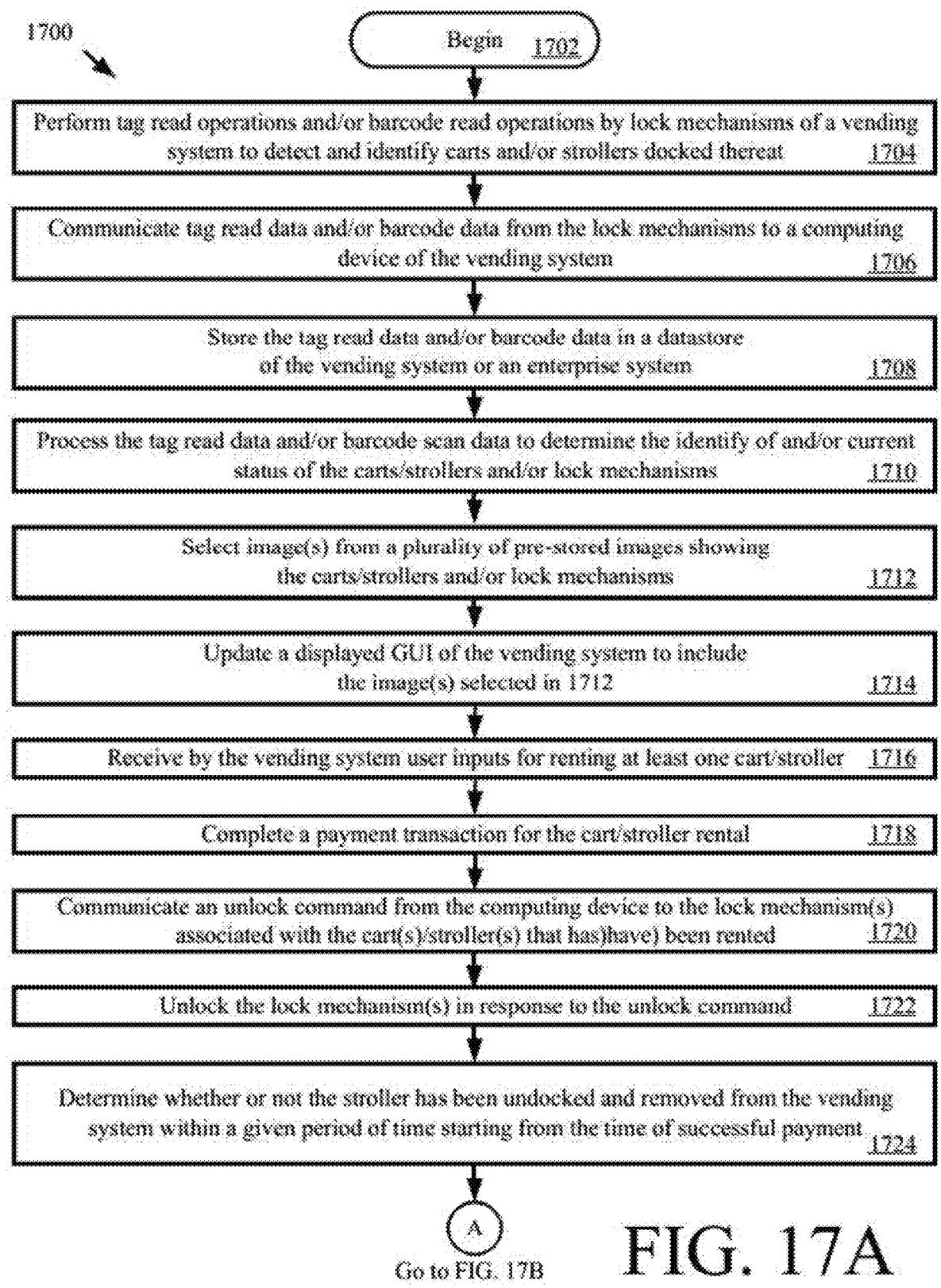
FIGS. 17A-17C (collectively referred to as "FIG. 17") provide a flow diagram of an illustrative method for operating a vending system in accordance with the present solution.
Figure 17B:
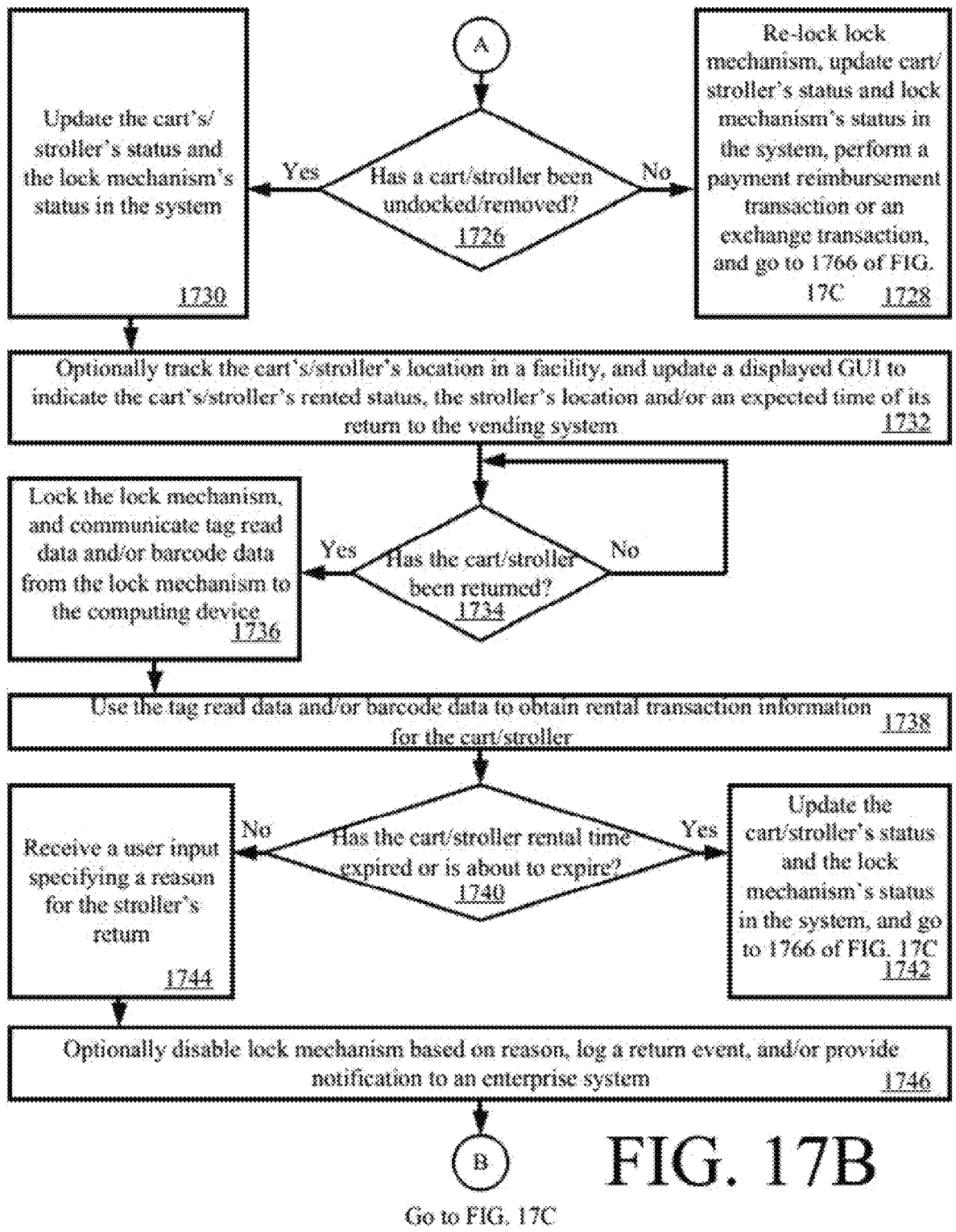

Referring now to FIG. 17, there is provided a flow diagram of an illustrative method 1700 for operating a vending system (e.g., vending system 100 of FIG. 1-3 or 300 of FIGS. 3-4). Method 1700 begins with 1702 and continues with 1704 where lock mechanisms (e.g., lock mechanisms 202 of FIGS. 1-2, 402 of FIG. 3-4, or 600 of FIGS. 6-12) perform tag read operations and/or barcode scan operations to detect and identify carts and/or strollers docked thereat. The tag read operations and/or barcode scan operations can be continuously performed, periodically performed at predefined times (e.g., every 5 minutes), or in response to trigger events (e.g., the return of a cart/stroller). Tag read data and/or barcode scan data is communicated from the lock mechanism to a computing device (e.g., computing device 110 of FIG. 1, 310 of FIG. 3, and/or 500 of FIG. 5) of the vending system in 1706. In 1708, the tag read data and/or the barcode scan data is stored in a datastore (e.g., memory 512 of FIG. 5) of the vending system or an enterprise system (e.g., a remote database accessible via a network, such as the Internet or Intranet).

In 1710, the tag read data and/or barcode scan data is processed by the computing device of the vending system to determine the identity of and/or the current status of the carts/strollers and/or lock mechanisms. The cart/stroller status can include, but is not limited to, a docked status, an undocked status, and/or an inoperable or damaged status. The cart/stroller inoperable or damaged status may be determined based on user inputs as an alternative to the tag read data and/or barcode read data. The lock mechanism status can include, but is not limited to, a locked status, an unlocked status, an inoperable or damaged status, and/or a disabled status.

In 1712, one or more images are selected by the computing device of the vending system from a plurality of pre-stored images of the carts/strollers and/or lock mechanisms based on the cart/stroller identity, the cart/stroller status, the lock mechanism identity, and/or lock mechanism status. A GUI (e.g., GUI 1500) displayed on a display (e.g., display 554 of FIG. 5) of the computing device is updated in 1714 to include the image(s) selected in 1712.

Next in 1716, the vending system receives user inputs for renting at least one cart/stroller and/or for selecting a device charging feature of a cart/stroller via the display GUI. The user inputs can include, but are not limited to, a user input of identifying information (e.g., a name, an address, a telephone number, an account number, a loyalty program number, etc.), a user selection of one or more displayed images, a user selection of an amount of time for a cart/stroller rental, a user selection of a payment means, and/or a user input for specifying a promotional code. In 1718, a payment transaction for the cart/stroller rental and/or use of the device charging feature is completed in accordance with the user inputs received in 1716 and/or other information (e.g., account information and/or loyalty program information).

Once payment has been successfully completed, 1720 is performed where an unlock command is communicated from the computing device to the lock mechanism(s) associated with the cart(s)/stroller(s) that have been rented. The lock mechanism(s) is(are) unlocked in response to the unlock command, as shown by 1722.

The vending system then monitors movement of and/or the lack of movement of the cart(s)/stroller(s) in 1724 to determine whether or not it(they) has(have) been undocked and removed from the lock mechanism(s) within a given period of time (e.g., 3 minutes) starting from the time of successful payment. Upon completing 1724, method 1700 continues with 1726 of FIG. 17B.

Figure 17C:
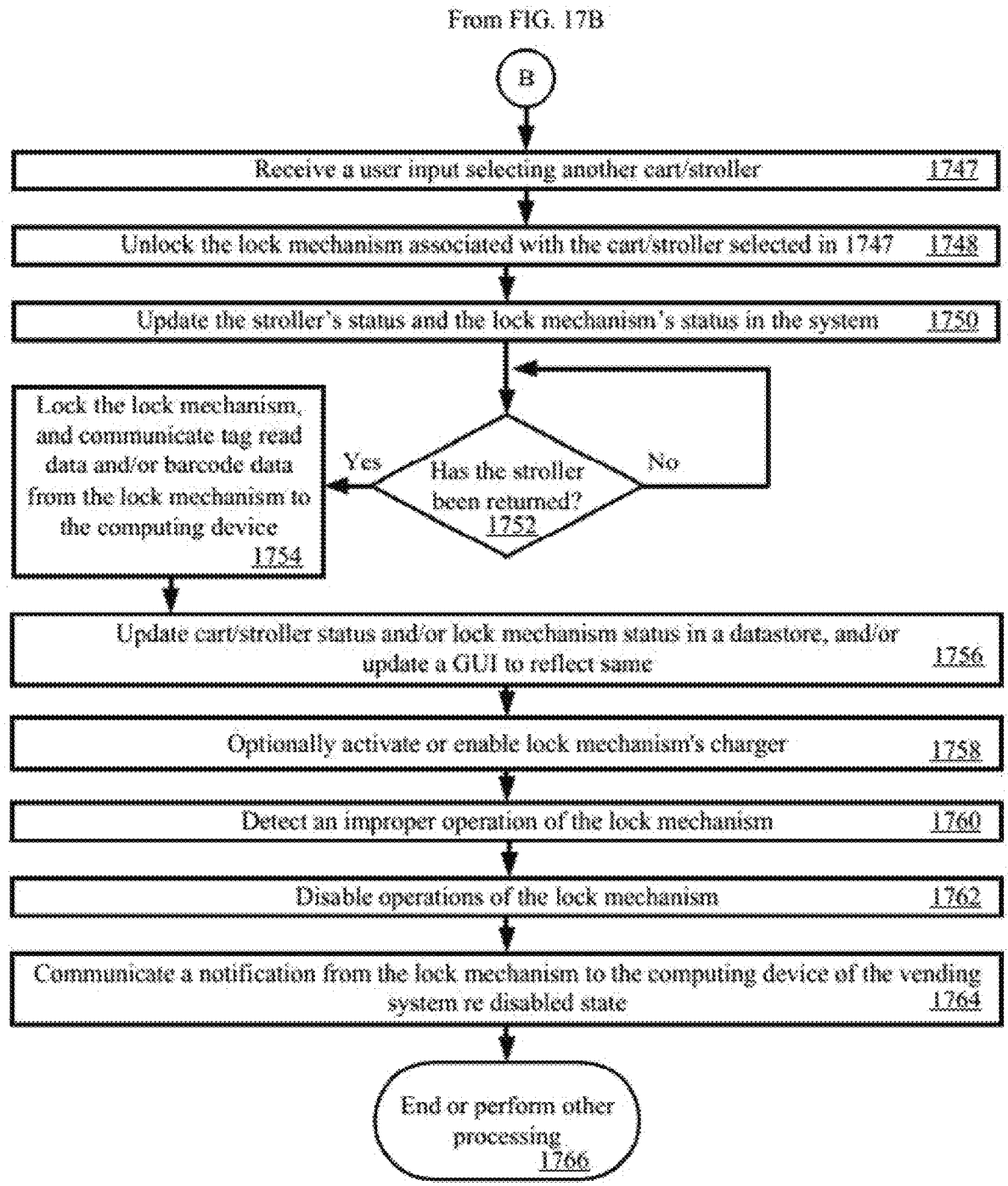

If a cart/stroller has not been undocked/removed from the lock mechanism [1726:NO], then 1728 is performed where the lock mechanism is relocked, the cart's/stroller's status is updated in the datastore, and the lock mechanism's status is updated in the datastore. A payment reimbursement transaction or a cart/stroller exchange transaction is also performed. Additionally, the GUI can be updated to once again include the image of the cart/stroller or lock mechanism. Thereafter, 1766 of FIG. 17C is performed where method 1700 ends or other processing is performed.

If a cart/stroller has been undocked/removed from the lock mechanism [1726:YES], then 1730 is performed where the cart's/stroller's status and the lock mechanisms statuses are updated in the system. In optional 1732, the cart's/stroller's location in the facility is tracked. The displayed GUI may also be updated in 1732 to indicate the cart's/stroller's rental status, location, and/or expected time of its return to the vending system.

Next, a decision is made in 1734 as to whether or not the cart/stroller has been returned. If so [1734:YES], then 1736 is performed where the lock mechanism is locked. Also, tag read data and/or barcode scan data is communicated from the lock mechanism to the computing device. At the computing device, the tag read data and/or barcode scan data is used to obtain rental transaction information for the cart/stroller, as shown by 1738.

In some scenarios, there is no time limit for a stroller rental. In other scenarios, a user may be able to select a time limit for a stroller rental, where the user pays more as the time is increased from a pre-set minimum time period (e.g., 1 hour). Accordingly, method 1700 may include optional 1740, 1744-1764.

If the rental transaction information indicates that the cart/stroller rental time has expired or is about to expire [1740:YES], then 1742 is performed where the cart/stroller status and/or lock mechanism status is updated in the system. 1766 of FIG. 17C is then performed where method 1700 ends or other processing is performed (e.g., return to 1712 of FIG. 17A).

If not [1740:NO], then optional 1744 is performed where the lock mechanism is disabled based on the reason (e.g., cart/stroller damaged), a return event is logged in the datastore, and/or a notification is provided to the enterprise system (e.g., notifying of cart/stroller damage such that a repairman can be deployed to the vending system). Upon completing 1744 and/or 1746, method 1700 continues with 1747 of FIG. 17C.

As shown in FIG. 17C, 1747 involves receiving a user input via the displayed GUI for selecting another cart/stroller. The lock mechanism associated with the newly selected cart/stroller is then unlocked in 1748. In 1750, the cart's/stroller's status and/or the lock mechanism's status is(are) updated in the system.

When the cart/stroller has been returned [1752:YES], 1754 is performed where the lock mechanism is locked, and tag read data and/or barcode read data is communicated from the lock mechanism to the computing device. The cart's/stroller's status and/or lock mechanism's status are updated in the system as shown by 1756. The displayed GUI may also be updated to reflect the same. The lock mechanism's charger may optionally be activated or enabled in 1758.

In some scenarios, an improper operation of the lock mechanism is detected as shown by 1760. When this occurs, the lock mechanism is disabled in 1760. A notification regarding the disabled state may also be communicated from the lock mechanism to the computing device, as shown by 1764. Subsequently, 1766 is performed where method 1700 ends or other processing is performed (e.g., return to 1716 of FIG. 17A).

Figure 18A:
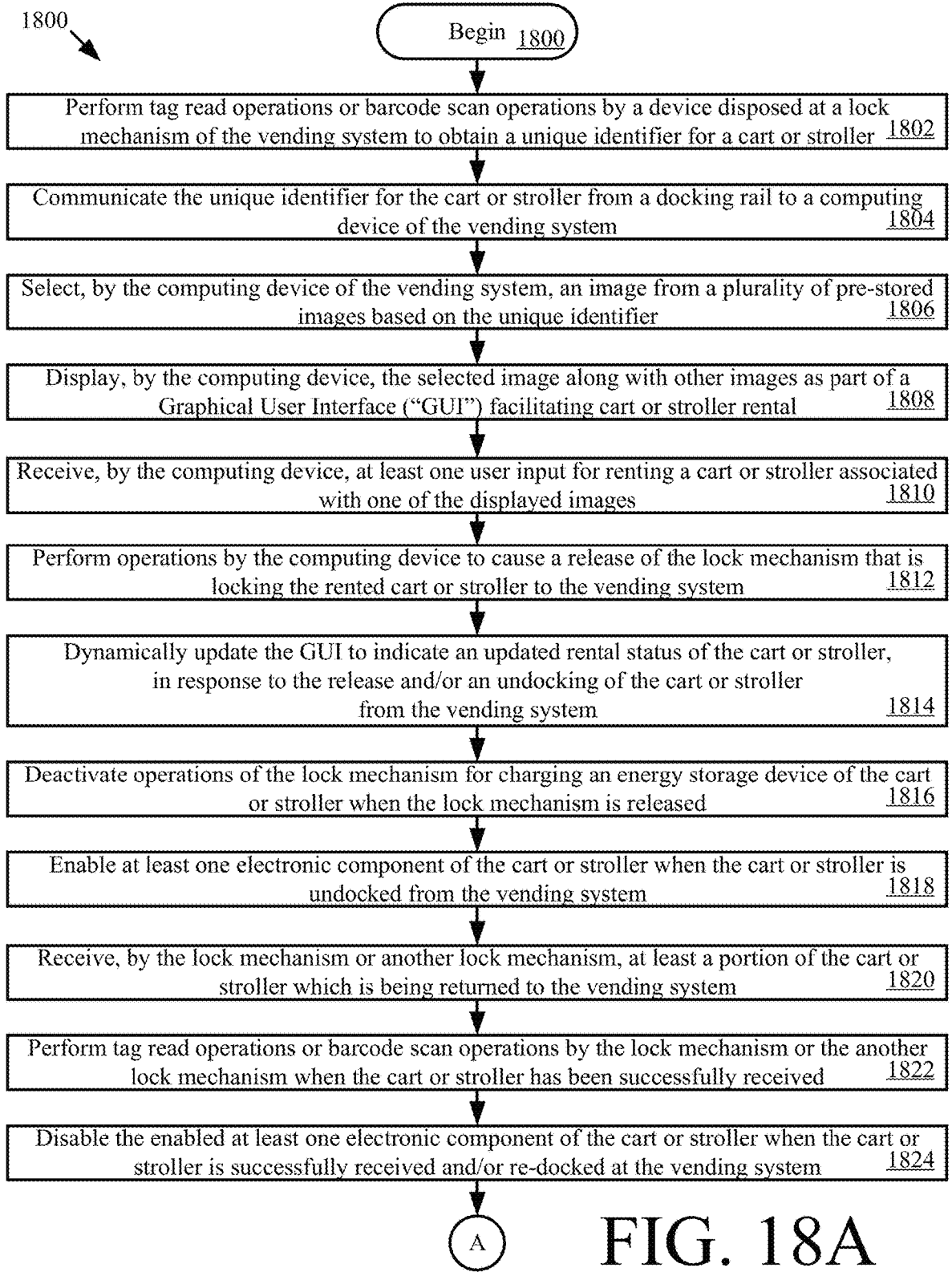
FIGS. 18A-18B (collectively referred to as "FIG. 18") provides a flow diagram of an illustrative method for operating a vending system for renting carts or strollers.

Referring now to FIG. 18, there is provided a flow diagram of an illustrative method 1800 for operating a vending system for renting carts or strollers. Method 1800 begins with 1802 and continues with 1804 where tag read operations or barcode scan operations are performed by a device disposed at a lock mechanism of the vending system to obtain a unique identifier for a cart or stroller. The device can include, but is not limited to, a docking rail of the vending system to which the lock mechanism is coupled. The unique identifier is communicated in 1804 from a docking rail to a computing device of the vending system. In 1806, the computing device selects an image from a plurality of pre-stored images based on the unique identifier. The selected image is displayed by the computing device along with other images as part of a GUI facilitating cart or stroller rental, as shown by 1808.

In 1810, the computing device receives at least one user input for renting a cart or stroller associated with one of the displayed images. The computing device then performs operations to cause a release of the lock mechanism that is locking the rented cart or stroller to the vending system, as shown by 1812.

In 1814, the GUI is dynamically updated to indicate an updated rental status of the cart or stroller. The dynamical GUI update may be performed in response to an undocking of the cart or stroller from the vending system. The dynamic update can involve removing at least one image from the GUI in response to a cart's or stroller's undocking from the vending system. In 1816, operations of the lock mechanism for charging an energy storage device of the cart or stroller are deactivated when the lock mechanism is released. In 1818, at least one electronic component of the cart or stroller is enabled when the cart or stroller is undocked from the vending system. This enablement can be achieved via a wireless communication from the lock mechanism to the at least one electronic component of the cart or stroller. The electronic component includes, but is not limited to, a device charger for charging personal devices.

In 1820, the lock mechanism or another lock mechanism receives at least a portion of the cart or stroller which is being returned to the vending system. Tag read operations or barcode scan operations are performed by the lock mechanism or the another lock mechanism in 1822 when the cart or stroller has been successfully received. In 1824, the enabled electronic component(s) of the cart or stroller is(are) disabled when the cart or stroller is successfully received and/or re-docked at the vending system. This disablement can be achieved via a wireless communication from the lock mechanism to the at least one electronic component of the cart or stroller. The electronic component(s) include(s), but is(are) not limited to, a device charger for charging personal devices. Upon completing 1824, method 1800 continues with 1826 of FIG. 18B.

Figure 18B:
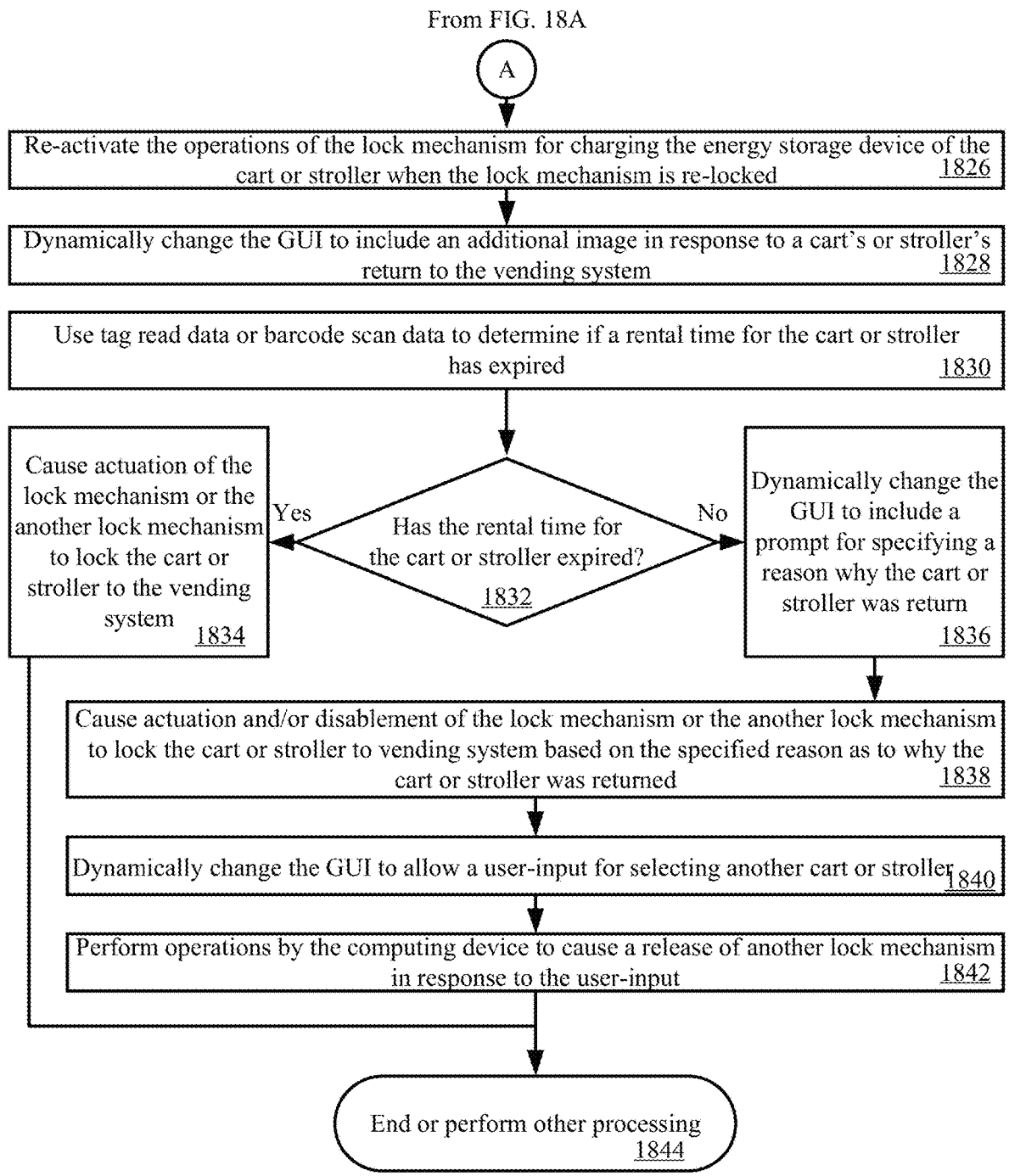

As shown in FIG. 18B, 1826 involves re-activating the operations of the lock mechanism for charging the energy storage device of the cart or stroller when the lock mechanism is re-locked. The GUI is dynamically changed in 1828 to include an additional image in response to then cart's return or stroller's return to the vending system.

In 1830, the tag read data or barcode scan data is used to determine if a rental time for the cart or stroller has expired. If the rental time has expired [1832:YES], then 1834 is performed where actuation of the lock mechanism or the another lock mechanism is caused so as to lock the cart or stroller to the vending system. Thereafter, 1844 is performed where method 1800 ends or other processing is performed (e.g., return to 1802 of FIG. 18A).

If the rental time has not expired [1832:NO], then 1836 is performed where the GUI is dynamically changed to include a prompt for specifying a reason why the cart or stroller was return. In 1838, operations are performed to cause actuation and/or disablement of the lock mechanism or the another lock mechanism so as to lock the cart or stroller to vending system based on the specified reason as to why the cart or stroller was returned. In 1840, operations are performed by the computing device to dynamically change the GUI to allow a user-input for selecting another cart or stroller. In 1842, the computing device causes a release of another lock mechanism in response to the user-input. Upon completing 1842, 1844 is performed where method 1800 ends or other processing is performed (e.g., return to 1802 of FIG. 18A).

The present solution is not limited to the operations shown in FIG. 18. Method 1800 can include more or less operations than that shown in FIG. 18. For example, method 1800 can additionally involve dynamically changing the GUI to remove at least one image therefrom in response to a detection of a defective lock mechanism, cart or stroller.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a vending system for renting carts or strollers, comprising:
    performing tag read operations or barcode scan operations by a device disposed at a lock mechanism of the vending system to obtain a unique identifier for a cart or stroller;
    selecting, by a computing device of the vending system, an image from a plurality of pre-stored images based on the unique identifier;
    displaying, by the computing device, the selected image along with other images as part of a graphical user interface facilitating cart or stroller rental;
    receiving, by the computing device, at least one user input for renting a cart or stroller associated with one of the displayed images; and
    performing operations by the computing device to cause a release of the lock mechanism that is locking the rented cart or stroller to the vending system.

2. The method according to claim 1, wherein the carts or strollers are stored in at least one row so as to have a side-by-side parallel arrangement.

3. The method according to claim 2, wherein an elongate horizontal axis, that runs from a front of each cart or stroller to a back of said each cart or stroller, is angled 90° relative to a docking rail of the vending system.

4. The method according to claim 1, wherein the device that performs the tag read operations or barcode scan operations comprises a docking rail of the vending system to which the lock mechanism is coupled.

5. The method according to claim 4, further comprising communicating the unique identifier for the cart or stroller from the docking rail to the computing device of the vending system.

6. The method according to claim 5, further comprising using the unique identifier by the computing device to obtain rental transaction information for the cart or stroller.

7. The method according to claim 1, further comprising dynamically updating the Graphical User Interface to indicate an updated rental status of the cart or stroller, in response to an undocking of the cart or stroller from the vending system.

8. The method according to claim 1, further comprising:
receiving, by the lock mechanism or another lock mechanism, at least a portion of the cart or stroller which is being returned to the vending system;
performing tag read operations or barcode scan operations by the lock mechanism or the another lock mechanism when the cart or stroller has been successfully received; and
using tag read data or barcode scan data to determine if a rental time for the cart or stroller has expired.

9. The method according to claim 8, further comprising causing actuation of the lock mechanism or the another lock mechanism to lock the cart or stroller to the vending system when a determination is made that the rental time for the cart has expired.

10. The method according to claim 9, further comprising dynamically changing the Graphical user Interface to include a prompt for specifying a reason why the cart or stroller was returned, when a determination is made that the rental time for the cart or stroller has not expired.

11. The method according to claim 10, further comprising causing actuation of the lock mechanism or the another lock mechanism to lock the cart or stroller to vending system based on the specified reason as to why the cart or stroller was returned.

12. The method according to claim 10, further comprising disabling the lock mechanism or the another lock mechanism based on the specified reason as to why the cart or stroller was returned.

13. The method according to claim 8, further comprising dynamically changing the Graphical User Interface to allow a user-input for selecting another cart or stroller, when a determination is made that the rental time for the cart or stroller has not expired.

14. The method according to claim 13, further comprising performing operations by the computing device to cause a release of another lock mechanism in response to the user-input.

15. The method according to claim 1, further comprising enabling at least one electronic component of the cart or stroller when the cart or stroller is undocked from the vending system.

16. The method according to claim 15, further comprising disabling the enabled at least one electronic component of the cart or stroller when the cart or stroller is re-docked at the vending system.

17. The method according to claim 16, wherein the enabling and disabling is achieved via a wireless communication from the lock mechanism to the at least one electronic component of the cart or stroller.

18. The method according to claim 15, wherein the at least one electronic component comprises a device charger for charging personal devices.

19. The method according to claim 1, further comprising deactivating operations of the lock mechanism for charging an energy storage device of the cart or stroller when the lock mechanism is released.

20. The method according to claim 19, further comprising re-activating the operations of the lock mechanism for charging the energy storage device of the cart or stroller when the lock mechanism is re-locked.

21. The method according to claim 19, wherein the energy storage device is at least partially disposed in or on a downward protruding post of the cart or stroller that is capturable by the lock mechanism.

22. The method according to claim 1, further comprising dynamically changing the graphical user interface to include an additional image in response to a cart's or stroller's return to the vending system.

23. The method according to claim 1, further comprising dynamically changing the graphical user interface to remove at least one image therefrom in response to a cart's or stroller's undocking from the vending system.

24. The method according to claim 1, further comprising dynamically changing the graphical user interface to remove at least one image therefrom in response to a detection of a defective lock mechanism, cart or stroller.

25. A vending system, comprising:
a processor; and
a non-transitory computer-readable storage medium comprising programming instructions that are configured to cause the processor to implement a method for operating a vending system for renting carts or strollers, wherein the programming instructions comprise instructions to:
cause a performance of tag read operations or barcode scan operations by a device disposed at a lock mechanism of the vending system to obtain a unique identifier for a cart or stroller;
select an image from a plurality of pre-stored images based on the unique identifier;
display the selected image along with other images as part of a graphical user interface facilitating cart or stroller rental;
receive at least one user input for renting a cart or stroller associated with one of the displayed images; and
cause a release of the lock mechanism that is locking the rented cart or stroller to the vending system.

26. The system according to claim 25, wherein the carts or strollers are stored in at least one row so as to have a side-by-side parallel arrangement.

27. The system according to claim 26, wherein an elongate horizontal axis, that runs from a front of each cart or stroller to a back of said each cart or stroller, is angled 90° relative to a docking rail of the vending system.

28. The system according to claim 25, wherein the device that performs the tag read operations or barcode scan operations comprises a docking rail of the vending system to which the lock mechanism is coupled.

29. The system according to claim 28, wherein the unique identifier for the cart or stroller is received from the docking rail of the vending system.

30. The system according to claim 29, wherein the programming instructions comprise instructions to use the unique identifier to obtain rental transaction information for the cart or stroller.

31. The system according to claim 25, wherein the programming instructions comprise instructions to cause a dynamic update of the graphical user interface to indicate an updated rental status of the cart or stroller, in response to an undocking of the cart or stroller from the vending system.

32. The system according to claim 25, wherein the programming instructions comprise instructions to:
cause tag read operations or barcode scan operations to be performed by the lock mechanism or another lock mechanism when the cart or stroller has been successfully received thereby; and use tag read data or barcode scan data to determine if a rental time for the cart or stroller has expired.

33. The system according to claim 32, wherein the programming instructions comprise instructions to cause actuation of the lock mechanism or the another lock mechanism to lock the cart or stroller to the vending system when a determination is made that the rental time for the cart has expired.

34. The system according to claim 33, wherein the programming instructions comprise instructions to cause a dynamic change of the graphical user interface to include a prompt for specifying a reason why the cart or stroller was return, when a determination is made that the rental time for the cart or stroller has not expired.

35. The system according to claim 34, wherein the programming instructions comprise instructions to cause actuation of the lock mechanism or the another lock mechanism to lock the cart or stroller to vending system based on the specified reason as to why the cart or stroller was returned.

36. The system according to claim 34, wherein the programming instructions comprise instructions to cause a disablement of the lock mechanism or the another lock mechanism based on the specified reason as to why the cart or stroller was returned.

37. The system according to claim 32, wherein the programming instructions comprise instructions to cause a dynamic change of the graphical user interface to allow a user-input for selecting another cart or stroller, when a determination is made that the rental time for the cart or stroller has not expired.

38. The system according to claim 37, wherein the programming instructions comprise instructions to cause a release of another lock mechanism in response to the user-input.

39. The system according to claim 25, wherein the programming instructions comprise instructions to cause an enablement of at least one electronic component of the cart or stroller when the cart or stroller is undocked from the vending system.

40. The system according to claim 39, wherein the programming instructions comprise instructions to cause a disablement of the enabled at least one electronic component of the cart or stroller when the cart or stroller is re-docked at the vending system.

41. The system according to claim 40, wherein the enabling and disabling is achieved via a wireless communication from the lock mechanism to the at least one electronic component of the cart or stroller.

42. The system according to claim 39, wherein the at least one electronic component comprises a device charger for charging personal devices.

43. The system according to claim 25, wherein the programming instructions comprise instructions to cause a deactivation of lock mechanism operations for charging an energy storage device of the cart or stroller when the lock mechanism is released.

44. The system according to claim 43, wherein the programming instructions comprise instructions to cause a re-activation of the lock mechanism operations for charging the energy storage device of the cart or stroller when the lock mechanism is re-locked.

45. The system according to claim 43, wherein the energy storage device is at least partially disposed in or on a downward protruding post of the cart or stroller that is capturable by the lock mechanism.

46. The system according to claim 25, wherein the programming instructions comprise instructions to cause a dynamic change in the graphical user interface to include an additional image in response to a cart's or stroller's return to the vending system.

47. The system according to claim 25, wherein the programming instructions comprise instructions to cause a dynamic change in the graphical user interface to remove at least one image therefrom in response to a cart's or stroller's undocking from the vending system.

48. The system according to claim 25, wherein the programming instructions comprise instructions to cause a dynamic change in the graphical user interface to remove at least one image therefrom in response to a detection of a defective lock mechanism, cart or stroller.

* * * * *